(12) United States Patent
Matsubara et al.

(10) Patent No.: US 7,824,307 B2
(45) Date of Patent: Nov. 2, 2010

(54) CONTROL DEVICE FOR VEHICLE POWER TRANSMISSION DEVICE

(75) Inventors: Tooru Matsubara, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 320 days.

(21) Appl. No.: 12/213,516

(22) Filed: Jun. 20, 2008

(65) Prior Publication Data
US 2008/0318727 A1 Dec. 25, 2008

(30) Foreign Application Priority Data
Jun. 20, 2007 (JP) ............................. 2007-163174

(51) Int. Cl.
*B60W 10/08* (2006.01)
(52) U.S. Cl. ......................................................... 477/5
(58) Field of Classification Search ................... None
See application file for complete search history.

(56) References Cited

U.S. PATENT DOCUMENTS

| | | | | |
|---|---|---|---|---|
| 5,982,045 A | * | 11/1999 | Tabata et al. ................... 290/17 |
| 6,258,008 B1 | * | 7/2001 | Tabata et al. ................. 477/107 |
| 6,926,639 B2 | * | 8/2005 | Hopper ........................ 477/110 |
| 7,360,616 B2 | * | 4/2008 | Schiele .................. 180/65.265 |
| 7,370,715 B2 | * | 5/2008 | Colvin et al. ............. 180/65.28 |
| 7,549,945 B2 | * | 6/2009 | Shibata et al. .................. 477/5 |
| 7,666,115 B2 | * | 2/2010 | Ito et al. ........................ 477/5 |
| 7,693,636 B2 | * | 4/2010 | Katou et al. ................... 701/54 |
| 2010/0125021 A1 | * | 5/2010 | Matsubara et al. .............. 477/5 |

FOREIGN PATENT DOCUMENTS

| | | |
|---|---|---|
| JP | B2-3149785 | 1/2001 |
| JP | B2-3346375 | 9/2002 |

* cited by examiner

*Primary Examiner*—Dirk Wright
(74) *Attorney, Agent, or Firm*—Oliff & Berridge, PLC

(57) ABSTRACT

A control device for a vehicle power transmission device including an electrical differential motion portion in which a differential state between input shaft rotation speed and output shaft rotation speed is controlled through control of the operation state of an electric motor linked to a rotating element of a differential motion portion, and a power connection-disconnection device constituting a portion of a power transmission path, includes a controller that lessens a transmission capacity of the power connection-disconnection device if during a switch of the state of the vehicle power transmission device from a non-driving state to a driving state, a change in input torque to the vehicle power transmission device occurs, in comparison with when the change in the input torque does not occur. Therefore, the control device reduces the shift shock when the vehicle power transmission device is switched from the non-driving to the driving state.

20 Claims, 12 Drawing Sheets

FIG.2

| | C1 | C2 | B1 | B2 | B3 | SPEED CHANGE RATIO | RATIO STEP |
|---|---|---|---|---|---|---|---|
| 1st | O | | | | O | 3.357 | |
| 2nd | O | | | O | | 2.180 | 1.54 |
| 3rd | O | | O | | | 1.424 | 1.53 |
| 4th | O | O | | | | 1.000 | 1.42 |
| R | | O | | | O | 3.209 | TOTAL 3.36 |
| N | | | | | | | |

O ENGAGED

CONTROL DEVICE FOR VEHICLE POWER TRANSMISSION DEVICE

INCORPORATION BY REFERENCE

The disclosure of Japanese Patent Application No. 2007-163174 filed on Jun. 20, 2007, including the specification, drawings and abstract is incorporated herein by reference in its entirety.

BACKGROUND OF THE INVENTION

1. Field of the Invention

The invention relates to a vehicle power transmission device and, more particularly, to a technology of reducing the shock that occurs when the vehicle power transmission device is switched from a non-driving state to a driving state.

2. Description of the Related Art

There is a known vehicle power transmission device that includes an electrical differential motion portion in which the differential state between the input shaft rotation speed and the output shaft rotation speed is controlled through the control of the operation state of an electric motor linked to a rotating element of a differential motion portion, and a power connection-disconnection device that constitutes a portion of a power transmission path. This vehicle power transmission device is used together with, for example, an engine as a motive power source, to realize a hybrid vehicle.

Through the control of the operation state of the electric motor linked to the rotating element of the electrical differential motion portion, the electrical differential motion portion can be caused to operate in various manners, that is, to output the power supplied to the input shaft from the engine provided as a motive power source directly to the output shaft, or to convert the whole or a portion of the power supplied from the engine into electric energy by using the electric motor as a generator, or to output the power generated by the electric motor alone or together with the power supplied from the engine to the output shaft.

On the other hand, the power connection-disconnection device can be used, for example, in a power transmission device, such as a clutch which is provided, on a power transmission path; a ratio shift portion whose speed change ratio can be changed; a stepped automatic transmission in which a plurality of speed change steps of different speed change ratios can be established by controlling the engagement and release of the engagement elements, such as clutches, brakes, etc.; a continuously variable transmission of a belt type, a toroidal type, etc., which includes a forward-reverse travel switch-over mechanism and whose speed change ratio is continuously changed, etc. Specifically, such a ratio shift portion is normally designed so that the ratio shift portion is switched between a non-driving state in which power transmission is cut off, such as the N (neutral) state, the P (parking) state, etc., and a driving state in which power transmission is performed, such as the D (drive) state, the R (reverse) state, etc. and the switching between the foregoing states is carried out in accordance with a driver's switching operation on a transmission state switch device that includes, for example, a shift lever, a manual shift valve, etc. Then, the power connection-disconnection device connects or disconnects the power transmission, whereby the ratio shift portion is switched between the non-driving state and the driving state, and therefore the vehicle power transmission device as a whole is also switched between the non-driving state and the driving state.

If the state of a motive power source changes when the vehicle power transmission device is switched from the non-driving state to the driving state, there is possibility that the switching to the driving state may not be smoothly carried out or a shift shock may occur. Against this problem, Japanese Patent No. 3346375 discloses a technology of reducing the shift shock by keeping fixed the states of output of the motive power source and the electric motor during the switch of the ratio shift portion from the non-driving state to the driving state.

By the way, according to the hybrid vehicle employing a vehicle power transmission device as described above, the vehicle is run while the engine as a motive power source is kept in an optimum differential state through the control of the operation state of the electric motor linked to the rotating element of the differential motion portion. However, during a low engine efficiency state, for example, when the vehicle is started from a halt state, or the like, the vehicle is run only by the electric motor. Therefore, during the state in which the vehicle is at a stop or the vehicle speed is low, power is not supplied from the engine but is supplied only from the electric motor at the time of a shift operation in which the ratio shift portion is switched from the non-driving state to the driving state, that is, at the time of a garage shift, for example, the N→D shift, the N→R shift, the P→R shift, etc.

However, if the state of charge (SOC) of the electricity storage device provided in the vehicle is low, the engine needs to be driven in order to generate electric power for charging the electricity storage device. Besides, the engine is also driven during the state where warm-up is needed. Such driving of the engine is sometimes performed regardless of the situation of run of the vehicle since the power thereby generated is not for use for running the vehicle. In the case where the foregoing driving of the engine is performed when the ratio shift portion is switched from the non-driving state to the driving state, there is possibility of a change occurring in the input torque to the vehicle driving device and therefore a shift shock being caused.

SUMMARY OF THE INVENTION

The invention has been accomplished against the background of the aforementioned circumstances, and provides a control device in a vehicle power transmission device that includes an electrical differential motion portion and a power connection-disconnection device, the control device being capable of reducing the shift shock when the vehicle power transmission device is switched from the non-driving state to the driving state.

According to one aspect of the invention, there is provided a control device for a vehicle power transmission device including an electrical differential motion portion in which a differential state between an input shaft rotation speed and an output shaft rotation speed is controlled through control of an operation state of an electric motor linked to a rotating element of a differential motion portion, and a power connection-disconnection device constituting a portion of a power transmission path. The control device includes a controller that lessens a transmission capacity of the power connection-disconnection device if during a switch of a state of the vehicle power transmission device from a non-driving state to a driving state, a change in input torque to the vehicle power transmission device occurs, in comparison with when the change in the input torque does not occur.

According to the control device for the vehicle power transmission device, in the case where a change in the input torque to the vehicle power transmission device occurs during a switch of the state of the vehicle power transmission device from the non-driving state to the driving state, the transmission capacity of the power connection-disconnection device is lessened in comparison with when the change in the input torque does not occur. Therefore, the transmission capacity of the power connection-disconnection device during a transitional state occurring at the start of connection of the power is changed according to changes in the input torque. Hence, the shift shock can be reduced even in the case where the input torque to the vehicle power transmission device changes during the switch of the state of the vehicle power transmission device from the non-driving state to the driving state.

According to another aspect of the invention, there is provided a control device for a vehicle power transmission device including an electrical differential motion portion in which a differential state between an input shaft rotation speed and an output shaft rotation speed is controlled through control of an operation state of an electric motor linked to a rotating element of a differential motion portion, and a power connection-disconnection device constituting a portion of a power transmission path. The control device includes a controller that delays start of connection by the power connection-disconnection device if during a switch of a state of the vehicle power transmission device from a non-driving state to a driving state, a change in input torque to the vehicle power transmission device occurs, in comparison with when the change in the input torque does not occur.

According to the control device for the vehicle power transmission device, in the case where a change in the input torque to the vehicle power transmission device occurs during a switch of the state of the vehicle power transmission device from the non-driving state to the driving state, the start of the connection of power by the power connection-disconnection device is delayed in comparison with the case where the change in the input torque does not occur. Therefore, the engagement elements are engaged after the change in the input torque has converged or has become diminished. Hence, the shift shock can be reduced even in the case where the input torque to the vehicle power transmission device changes during the switch of the state of the vehicle power transmission device from the non-driving state to the driving state.

The control device may further include a vehicle start intention determination device that determines a vehicle start intention determination device that determines degree of a driver's intention to start a vehicle on the basis of accelerator operation amount that corresponds to the amount of depression of an accelerator pedal provided in the vehicle. With this construction, the degree of the driver's intention to start the vehicle is determined on the basis of the accelerator operation amount that corresponds to the driver's requested drive force. Therefore, the degree of the intention to start the vehicle that reflects the driver's intention is determined.

Besides, the vehicle start intention determination device may also determine the degree of the driver's intention to start the vehicle on the basis of the state of a brake switch that detects whether a brake pedal provided in the vehicle is being operated. With this construction, the vehicle start intention determination device can determine the case where the driver is operating the brake pedal, that is, one of the cases where a shift shock is likely to be perceived, as being a case where the degree of the driver's intention to start the vehicle is low.

Besides, the vehicle start intention determination device may determine the degree of the driver's intention to start the vehicle on the basis of at least one of braking operation amounts, for example, the output pressure of a brake master cylinder, the depression force on a brake pedal, and the depression amount (stroke) of the brake pedal. With this construction, the vehicle start intention determination device determines the degree of the driver's intention to start the vehicle on the basis of the braking control amount, and therefore can determine the case where the driver is performing a braking operation, that is, the case where the shift shock is particularly likely to be perceived, as being a case where the degree of the driver's intention to start the vehicle is low.

BRIEF DESCRIPTION OF THE DRAWINGS

The foregoing and further features and advantages of the invention will be better understood by reading the following detailed description of preferred embodiments of the invention, when considered in connection with the accompanying drawings, in which:

FIG. 2 is a operation diagram illustrating relations between the speed change steps established in an automatic ratio shift portion that constitutes the transmission mechanism shown in FIG. 1 and the operations of friction engagement devices employed in the transmission mechanism;

DETAILED DESCRIPTION OF THE EMBODIMENTS

In the following description and the accompanying drawings, the present invention will be described in greater detail with reference to the example embodiments.

Figure 1:
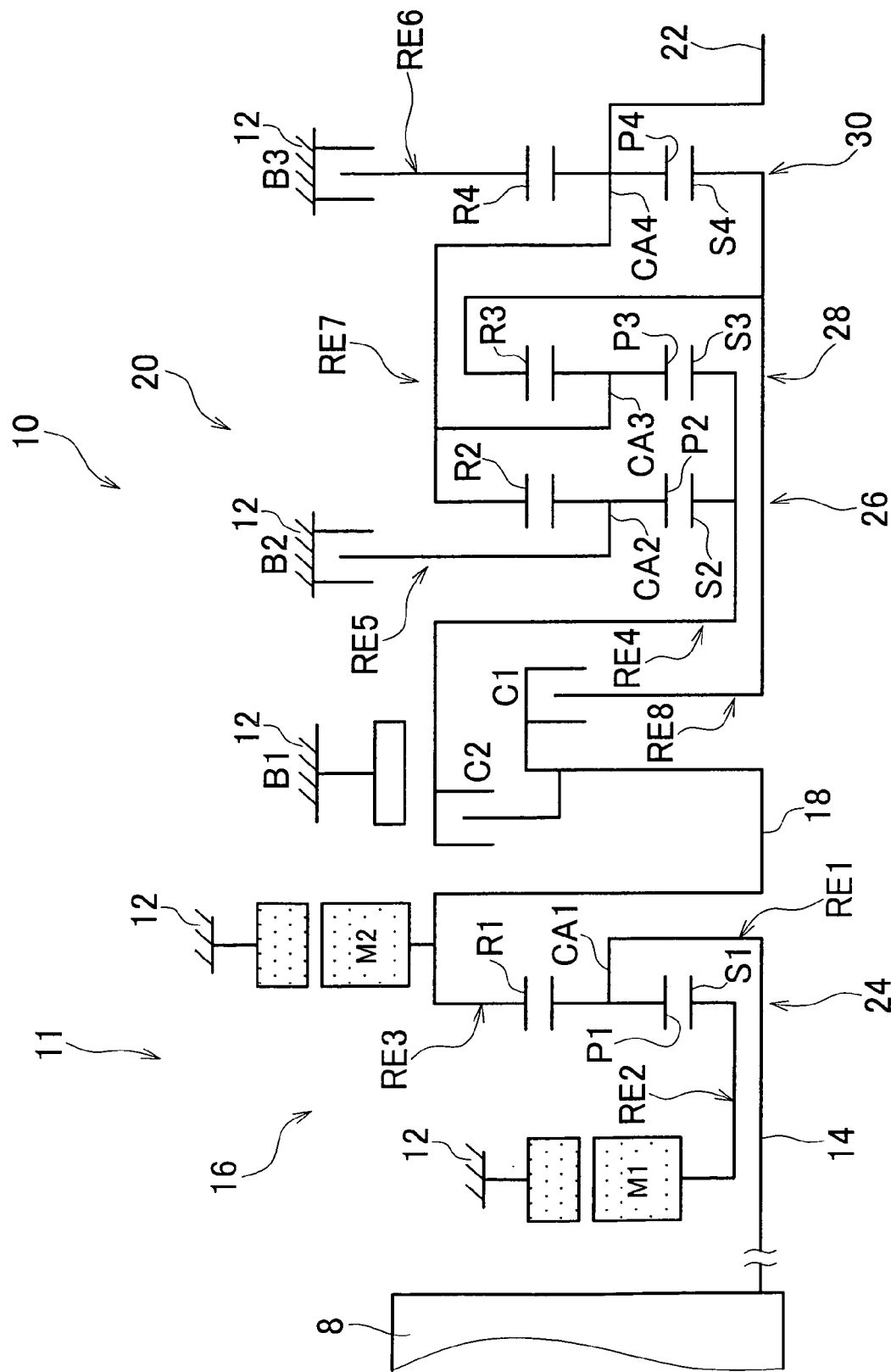
FIG. 1 is a skeleton diagram of a transmission mechanism that constitutes a portion of a vehicle power transmission device to which the invention is applied.

A first embodiment of the invention will be described in detail with reference to the drawings. FIG. 1 is a skeleton diagram illustrating a transmission mechanism 10 that constitutes a portion of a power transmission device of a hybrid vehicle to which the invention is applied. In FIG. 1, the transmission mechanism 10 includes an input shaft 14 as an input rotating member, a differential motion portion 11 as a stepless ratio shift portion that is linked directly to the input shaft 14 or indirectly thereto via a pulsation absorbing damper (vibration damping device) (not shown) or the like, an automatic ratio shift portion 20 as a power transmission portion that is linked in series in the power transmission path between the differential motion portion 11 and driving wheels 34 (see FIG. 7) via a transmission member (power transmission shaft) 18, and an output shaft 22 as an output rotating member that is linked to the automatic ratio shift portion 20. These members of the transmission mechanism 10 are disposed on a common center axis within a transmission case 12 (hereinafter, referred to as "the case 12") provided as a non-rotating member attached to a vehicle body. This transmission mechanism 10 is suitably used in, for example, an FR (front engine, rear wheel drive) type vehicle in which the mechanism 10 is longitudinally mounted. The transmission mechanism 10 is provided between a pair of driving wheels 34 and an internal combustion engine 8, for example, a gasoline engine, a diesel engine, etc., provided as a vehicle-running drive force source which is directly linked to the input shaft 14 or indirectly linked thereto via a pulsation absorbing damper (not shown). The transmission mechanism 10 transmits power from the engine 8 to the pair of driving wheels 34, sequentially via differential gear device (final speed reducer) 32 (see FIG. 7), a pair of axle shafts, etc., which each form a portion of the power transmission path.

In the transmission mechanism 10 of the first embodiment, the engine 8 and the differential motion portion 11 are directly coupled. Being directly coupled herein means being linked without the intervention of a fluid type transmission device, such as a torque converter, a fluid coupling, etc.; for example, the aforementioned linkage via the pulsation absorbing damper or the like is included in this direct coupling. Incidentally, the transmission mechanism 10 is constructed symmetrically about its axis, and in the skeleton diagram of FIG. 1, the lower half thereof is omitted from illustration.

The differential motion portion 11 includes a first electric motor M1, a power distribution mechanism 16 as a differential mechanism which is a mechanical mechanism that mechanically distributes the output of the engine 8 (hereinafter, referred to as "the engine output") input to the input shaft 14 and which distributes the engine output to the first electric motor M1 and the transmission member 18, and a second electric motor M2 that is operatively linked to the transmission member 18 so as to rotate integrally with the transmission member 18. The first electric motor M1 and the second electric motor M2 in the first embodiment are so-called motor-generators that also have an electric power generating function. Furthermore, the first electric motor M1 is equipped at least with a generator (power generation) function for generating a reaction force, and the second electric motor M2 is equipped at least with a motor (electric motor) function for outputting drive force as a vehicle-running drive force source.

The power distribution mechanism 16 is constructed mainly of a single-pinion type first planetary gear device 24 that has a predetermined gear ratio ρ1 that is, for example, about 0.418. The rotating elements (elements) of the first planetary gear device 24 include a first sun gear S1, first planetary gears P1, a first carrier CA1 that supports the first planetary gears P1 so that each of the first planetary gears P1 is rotatable about its own axis as well as revolvable, and a first ring gear R1 that meshes with the first sun gear S1 via the first planetary gears P1. If the number of teeth of the first sun gear S1 is ZS1 and the number of teeth of the first ring gear R1 is ZR1, the aforementioned gear ratio ρ1 is ZS1/ZR1.

In the power distribution mechanism 16, the first carrier CA1 is linked to the input shaft 14, that is, to the engine 8, and the first sun gear S1 is linked to the first electric motor M1, and the first ring gear R1 is linked to the transmission member 18. Since the power distribution mechanism 16 is put into a state in which differential motion can be performed, that is, a differential state in which the differential motion occurs, as three of the elements of the first planetary gear device 24, that is, the first sun gear S1, the first carrier CA1 and the first ring gear R1, are allowed to rotate relatively to each other, the engine output is distributed between the first electric motor M1 and the transmission member 18, and the electric energy that the first electric motor M1 generates from a portion of the engine output distributed thereto is electrically stored or is used to rotationally drive the second electric motor M2. Thus, the differential motion portion 11 (the power distribution mechanism 16) is caused to function as an electrical differential device; for example, the differential motion portion 11 is put into a so-called stepless or continuously variable transmission state (electrical CVT state), in which the rotation of the transmission member 18 is continuously changed despite a predetermined rotation speed of the engine 8. That is, the differential motion portion 11 is an electrical differential motion portion that functions as an electrical continuously variable transmission whose speed change ratio γ0 (the rotation speed NIN of the input shaft 14/the rotation speed N18 of the transmission member 18) is continuously changed from a minimum value γ0min to a maximum value γ0max.

The automatic ratio shift portion 20 is a planetary gear-type multi-stepped-speed transmission that includes a single-pinion type second planetary gear device 26, a single-pinion type third planetary gear device 28 and a single-pinion type fourth planetary gear device 30, and that functions as a stepped-speed-type automatic transmission. The second planetary gear device 26 includes a second sun gear S2, second planetary gears P2, a second carrier CA2 supporting each of the second planetary gears P2 rotatably about its own axis and also revolvably, and a second ring gear R2 meshing with the second sun gear S2 via the second planetary gears P2, and has a predetermined gear ratio ρ2 of, for example, about "0.562". The third planetary gear device 28 includes a third sun gear S3, third planetary gears P3, a third carrier CA3 supporting each of the third planetary gears P3 rotatably about its own axis and also revolvably, and a third ring gear R3 meshing with the third sun gear S3 via the third planetary gears P3, and has a gear ratio ρ3 of, for example, about "0.425". The fourth planetary gear device 30 includes a fourth sun gear S4, fourth planetary gears P4, a fourth carrier CA4 supporting each of the fourth planetary gears P4 about its own axis and also revolvably, and a fourth ring gear R4 meshing with the fourth sun gear S4 via the fourth planetary gears P4, and has a gear ratio ρ4 of, for example, about "0.421". If the number of teeth of the second sun gear S2 is ZS2 and the number of teeth of the second ring gear R2 is ZR2 and the number of teeth of the third sun gear S3 is ZS3 and the number of teeth of the third ring gear R3 is ZR3 and the number of teeth of the fourth sun gear S4 is ZS4 and the number of teeth of the fourth ring gear R4 is ZR4, then the aforementioned gear ratio ρ2 is ZS2/ZR2, and the aforementioned gear ratio ρ3 is ZS3/ZR3, and the gear ratio ρ4 is ZS4/ZR4.

In the automatic ratio shift portion 20, the second sun gear S2 and the third sun gear S3 are integrally interlinked, and are selectively linked to the transmission member 18 via a second clutch C2, and also is selectively linked to the case 12 via a first brake B1. The second carrier CA2 is selectively linked to the case 12 via a second brake B2, and the fourth ring gear R4 is selectively linked to the case 12 via a third brake B3. Furthermore, the second ring gear R2, the third carrier CA3 and the fourth carrier CA4 are integrally interlinked, and are linked to the output shaft 22. The third ring gear R3 and the fourth sun gear S4 are integrally interlinked, and are selectively linked to the transmission member 18 via a first clutch C1.

In this manner, the interior of the automatic ratio shift portion 20 and the differential motion portion 11 (the transmission member 18) are selectively interlinked via at least one of the first clutch C1 and the second clutch C2, which are used to establish gear steps (speed change steps) of the automatic ratio shift portion 20. In other words, the first clutch C1 and the second clutch C2 function as an engagement device that selectively switches the power transmission path between the transmission member 18 and the automatic ratio shift portion 20, that is, the power transmission path from the differential motion portion 11 (the transmission member 18) to the driving wheels 34, between a power transmission-capable state in which the power transmission through the power transmission path is made possible, and a power transmission cut-off state in which the power transmission through the power transmission path is cut off. Specifically, as at least one of the first clutch C1 and the second clutch C2 is engaged, a driving state of the vehicle in which the foregoing power transmission path is in the power transmission-capable state is brought about. As both the first clutch C1 and the second clutch C2 are released, a non-driving state of the vehicle in which the power transmission path is in the power transmission cut-off state is brought about. That is, of the friction engagement elements of the automatic ratio shift portion 20, at least the first clutch C1 and the second clutch C2 correspond to power connection-disconnection devices.

Besides, the automatic ratio shift portion 20 attains the speed change ratio γ(=the transmission member 18 of the rotation speed N18/the output shaft 22 of the rotation speed NOUT) that changes at substantially equal ratios for each gear step as the clutch-to-clutch shift is carried out by the release of a release-side engagement device and the engagement of an engagement-side engagement device so as to selectively establish each gear step. For example, as shown in the engagement operation table of FIG. 2, the engagement of the first clutch C1 and of the third brake B3 establishes a first speed gear step whose speed change ratio γ1 is the maximum value, for example, about "3.357". The engagement of the first clutch C1 and of the second brake B2 establishes a second-speed gear step whose speed change ratio γ2 is a value that is smaller than that of the first speed gear step, for example, about "2.180", and the engagement of the first clutch C1 and of the first brake B1 establishes a third-speed gear step whose speed change ratio γ is a value that is smaller than that of the second-speed gear step, for example, about "1.424", and the engagement of the first clutch C1 and of the second clutch C2 establishes a fourth-speed gear step whose speed change ratio γ4 is a value that is smaller than that of the third-speed gear step, for example, about "1.000". Besides, the engagement of the second clutch C2 or the third brake B3 establishes a reverse travel gear step (reverse travel speed change step) whose speed change ratio γR is a value that is between that of the first speed gear step and that of the second-speed gear step, for example, about "3.209". Besides, the release of the first clutch C1, the second clutch C2, the first brake B1, the second brake B2 and the third brake B3 brings about a neutral "N" state.

The first clutch C1, the second clutch C2, the first brake B1, the second brake B2 and the third brake B3 (hereinafter, termed the clutches C and the brakes B if distinction thereof is not particularly made) are hydraulic type friction engagement devices as engagement elements that are often employed in related-art vehicle automatic transmissions. The clutches C and the brakes B are each made up of a wet multiplate clutch in which a plurality of friction discs superposed on each other are pressurized against each other by a hydraulic actuator, a band brake in which an end of one or two bands wrapped around an outer peripheral surface of a rotating drum is pulled tight by a hydraulic actuator, etc. Each of the clutches C and the brakes B is provided for selectively linking both side members between which it is disposed.

In the transmission mechanism 10 constructed as described above, the differential motion portion 11 that functions as a continuously variable transmission, and the automatic ratio shift portion 20 make up a continuously variable transmission as a whole. Besides, if the differential motion portion 11 is controlled so that its speed change ratio remains constant, the differential motion portion 11 and the automatic ratio shift portion 20 can make up a device that is substantially the same as a stepped ratio transmission.

Concretely, when the differential motion portion 11 functions as a continuously variable transmission and the automatic ratio shift portion 20 connected in series to the differential motion portion 11 functions as a stepped ratio transmission, the rotation speed input to the automatic ratio shift portion 20 (hereinafter, referred to as the input rotation speed of the automatic ratio shift portion 20) with respect to at least one speed change step M of the automatic ratio shift portion 20, that is, the rotation speed of the transmission member 18 (hereinafter, referred to as "the transmission member rotation speed N18"), is steplessly changed, so that a stepless speed change ratio width at the speed change step M can be obtained. Therefore, the overall speed change ratio γT of the transmission mechanism 10 (=the input shaft 14 of the rotation speed NIN/the output shaft 22 of the rotation speed NOUT) is steplessly obtained, and thus a continuously variable transmission is constructed in the transmission mechanism 10. The overall speed change ratio γT of the transmission mechanism 10 is a total speed change ratio γT of the transmission mechanism 10 as a whole which is formed on the basis of the speed change ratio γ0 of the differential motion portion 11 and the speed change ratio γ of the automatic ratio shift portion 20.

For example, for each of the first to fourth gear steps and the reverse travel gear step of the automatic ratio shift portion 20 shown in the engagement operation table of FIG. 2, the transmission member rotation speed N18 is steplessly changed, so that each gear step is provided with a stepless speed change ratio width. Therefore, the speed change ratio is continuously variable between the gear steps, so that the total speed change ratio γT of the transmission mechanism 10 as a whole is steplessly varied.

When the speed change ratio of the differential motion portion 11 is controlled so as to be constant and the clutches C and the brakes B are selectively engaged so as to selectively establish one of the first to fourth speed gear steps and the reverse travel gear step (reverse travel speed change step), the total speed change ratios γT of the transmission mechanism 10 varying substantially at equal ratios of variation can be obtained for the individual gear steps. Therefore, in the transmission mechanism 10, a state that is substantially the same as that of a stepped ratio transmission is formed.

For example, the speed change ratio γ0 of the differential motion portion 11 is controlled so as to be fixed at "1", the total speed change ratios γT of the transmission mechanism 10 corresponding to the individual ones of the first to fourth speed gear steps and the reverse travel gear step of the automatic ratio shift portion 20 as shown in the engagement operation table of FIG. 2 can be obtained. Furthermore, if while the fourth-speed gear step is selected in the automatic ratio shift portion 20, the speed change ratio γ0 of the differential motion portion 11 is controlled so as to be fixed at a value smaller than "1", for example, at about 0.7, a total speed change ratio that is smaller than that of the fourth-speed gear step, for example, a total speed change ratio of about "0.7", is obtained.

Figure 3:
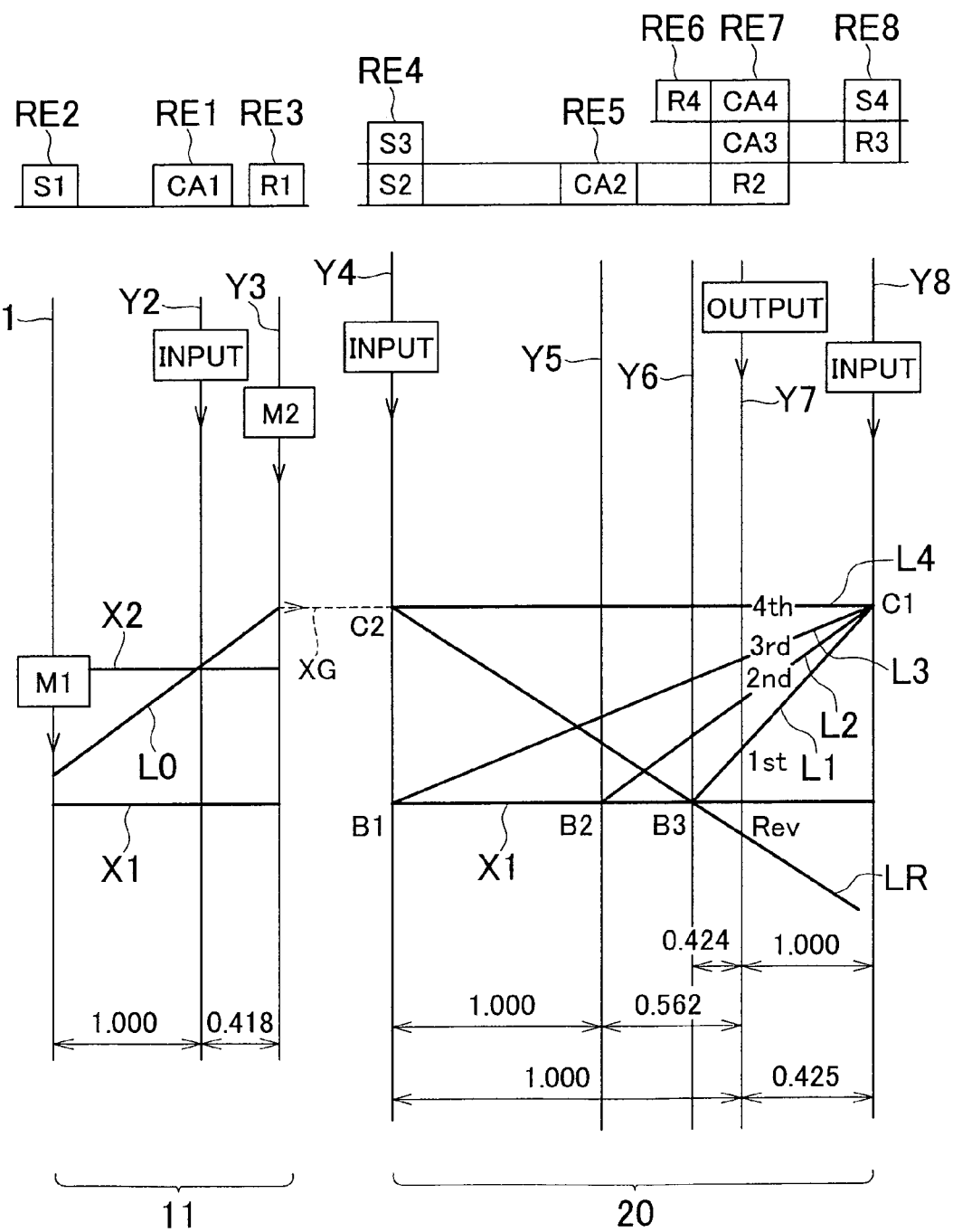
FIG. 3 is an alignment chart illustrating the relative rotation speeds of various gears in the transmission mechanism shown in FIG. 1.

FIG. 3 shows an alignment chart that represents on straight lines the relationships among the rotation speeds of various rotating elements varying in the state of linkage for the individual gear steps in the transmission mechanism 10 that is constructed of the differential motion portion 11 and the automatic ratio shift portion 20. The alignment chart in FIG. 3 is of a two-dimensional coordinate system made up of a horizontal axis that shows relationships among the gear ratios β of the planetary gears devices 24, 26, 28, 30, and a vertical axis that shows relative rotation speeds. In the chart, a horizontal line X1 shows a rotation speed of zero, and a horizontal line X2 shows a rotation speed of "1.0", which is the rotation speed NE of the engine 8 linked to the input shaft 14, and a horizontal line XG shows the rotation speed of the transmission member 18.

Besides, three vertical lines Y1, Y2, Y3 corresponding to three elements of the power distribution mechanism 16 constituting the differential motion portion 11 show the relative rotation speeds of the first sun gear S1 corresponding to a second rotating element (second element) RE2, the first carrier CA1 corresponding to a first rotating element (first element) RE1, and the first ring gear R1 corresponding to a third rotating element (third element) RE3, in that order from the left-hand side. The intervals between the three vertical lines are determined according to the gear ratio ρ1 of the first planetary gear device 24. Furthermore, five vertical lines Y4, Y5, Y6, Y7, Y8 regarding the automatic ratio shift portion 20 represent the second sun gear S2 and the third sun gear S3 that correspond to a fourth rotating element (fourth element) RE4 and that are interlinked with each other, the second carrier CA2 corresponding to a fifth rotating element (fifth element) RE5, the fourth ring gear R4 corresponding to a sixth rotating element (sixth element) RE6, the second ring gear R2, the third carrier CA3 and the fourth carrier CA4 that correspond to a seventh rotating element (seventh element) RE7 and that are interlinked with each other, and the third ring gear R3 and the fourth sun gear S4 that correspond to an eighth rotating element (eighth element) RE8 and that are interlinked with each other, respectively. The intervals between the vertical lines are respectively determined according to the gear ratios ρ2, ρ3, ρ4 of the second, third and fourth planetary gear devices 26, 28, 30. In the relationship among the vertical lines in the alignment chart, if the interval between the sun gear and the carrier is set at an interval corresponding to "1", the interval between the carrier and the ring gear becomes an interval corresponding to the gear ratio ρ of the planetary gear device. Specifically, in the differential motion portion 11, the interval between the vertical line Y1 and the vertical line Y2 is set at an interval that corresponds to "1", and the interval between the vertical line Y2 and the vertical line Y3 is set at an interval that corresponds to the gear ratio ρ1. Besides, as for each of the second, third and fourth planetary gear devices 26, 28, 30 of the automatic ratio shift portion 20, the interval between the vertical lines of the sun gear and the carrier is set at an interval that corresponds to "1", and the interval between the vertical lines of the carrier and the ring gear is set at an interval that corresponds to ρ.

The transmission mechanism 10 of this first embodiment, if described through the use of the alignment chart in FIG. 3, is constructed as follows. That is, in the power distribution mechanism 16 (the differential motion portion 11), the first rotating element RE1 (the first carrier CA1) of the first planetary gear device 24 is linked to the input shaft 14, that is, to the engine 8, and the second rotating element RE2 is linked to the first electric motor M1, and the third rotating element (the first ring gear R1) RE3 is linked to the transmission member 18 and the second electric motor M2, so that rotation of the input shaft 14 is transmitted (input) to the automatic ratio shift portion 20 via the transmission member 18. In conjunction with this construction, a diagonal straight line L0 passing through the intersection point between the line Y2 and the line X2 shows a relationship between the rotation speed of the first sun gear S1 and the rotation speed of the first ring gear R1.

For example, in the case where the differential motion portion 11 is in a differential state in which the first to third rotating elements RE1 to RE3 are rotatable relative to each other, and the rotation speed of the first ring gear R1 shown by the intersection point between the straight line L0 and the vertical line Y3 is restricted to a vehicle speed V and is therefore substantially constant, the rotation speed of the first sun gear S1 shown by the intersection point between the straight line L0 and the vertical line Y1, that is, the rotation speed of the first electric motor M1, becomes raised or lowered if the rotation speed of the first carrier CA1 shown by the intersection point between the straight line L0 and the vertical line Y2 is raised or lowered by controlling the engine rotation speed NE.

Besides, if the rotation speed of the first sun gear S1 is made equal to the engine rotation speed NE by controlling the rotation speed of the first electric motor M1 so that the speed change ratio γ0 of the differential motion portion 11 becomes fixed at "1", the straight line L0 comes to coincide with the horizontal line X2, and the first ring gear R1 is rotated, that is, the transmission member 18 is rotated, at the same rotation speed as the engine rotation speed NE. Or, if the rotation speed of the first sun gear S1 is made zero by controlling the rotation speed of the first electric motor M1 so that the speed change ratio γ0 of the differential motion portion 11 becomes fixed at a value smaller than "1", for example, at about 0.7, the transmission member rotation speed N18 is rotated at a rotation speed that is greater than the engine rotation speed NE.

Besides, in the automatic ratio shift portion 20, the fourth rotating element RE4 is selectively linked to the transmission member 18 via the second clutch C2, and is also selectively linked to the case 12 via the first brake B1, and the fifth rotating element RE5 is selectively linked to the case 12 via the second brake B2, and the sixth rotating element RE6 is selectively linked to the case 12 via the third brake B3, and the seventh rotating element RE7 is linked to the output shaft 22, and the eighth rotating element RE8 is selectively linked to the transmission member 18 via the first clutch C1.

In the automatic ratio shift portion 20, if with regard to the differential motion portion 11, the straight line L0 is made to coincide with the horizontal line X2 and therefore the rotation speed equal to the engine rotation speed NE is input from the differential motion portion 11 to the eighth rotating element RE8, the first clutch C1 and the third brake B3 are engaged as shown in FIG. 3, so that the rotation speed of the output shaft 22 at the first speed (1st) is shown by the intersection point between the vertical line Y7 showing the rotation speed of the seventh rotating element RE7 linked to the output shaft 22 and the diagonal straight line L1 passing through the intersection point between the horizontal line X1 and the vertical line Y6 showing the rotation speed of the sixth rotating element RE6 and also through the intersection point between the horizontal line X2 and the vertical line Y8 showing the rotation speed of the eighth rotating element RE8. Likewise, the rotation speed of the output shaft 22 at the second speed (2nd) is shown by the intersection point between the vertical line Y7 showing the rotation speed of the seventh rotating element RE7 linked to the output shaft 22 and a diagonal straight line L2 determined by the engagement of the first clutch C1 and of the second brake B2. The rotation speed of the output shaft 22 at the third speed (3rd) is shown by the intersection point between the vertical line Y7 showing the rotation speed of the seventh rotating element RE7 linked to the output shaft 22 and a diagonal straight line L3 determined by the engagement of the first clutch C1 and of the first brake B1. The rotation speed of the output shaft 22 at the fourth speed (4th) is shown by the intersection point between the vertical line Y7 showing the rotation speed of the seventh rotating element RE7 linked to the output shaft 22 and a horizontal straight line L4 determined by the engagement of the first clutch C1 and of the second clutch C2.

Figure 4:
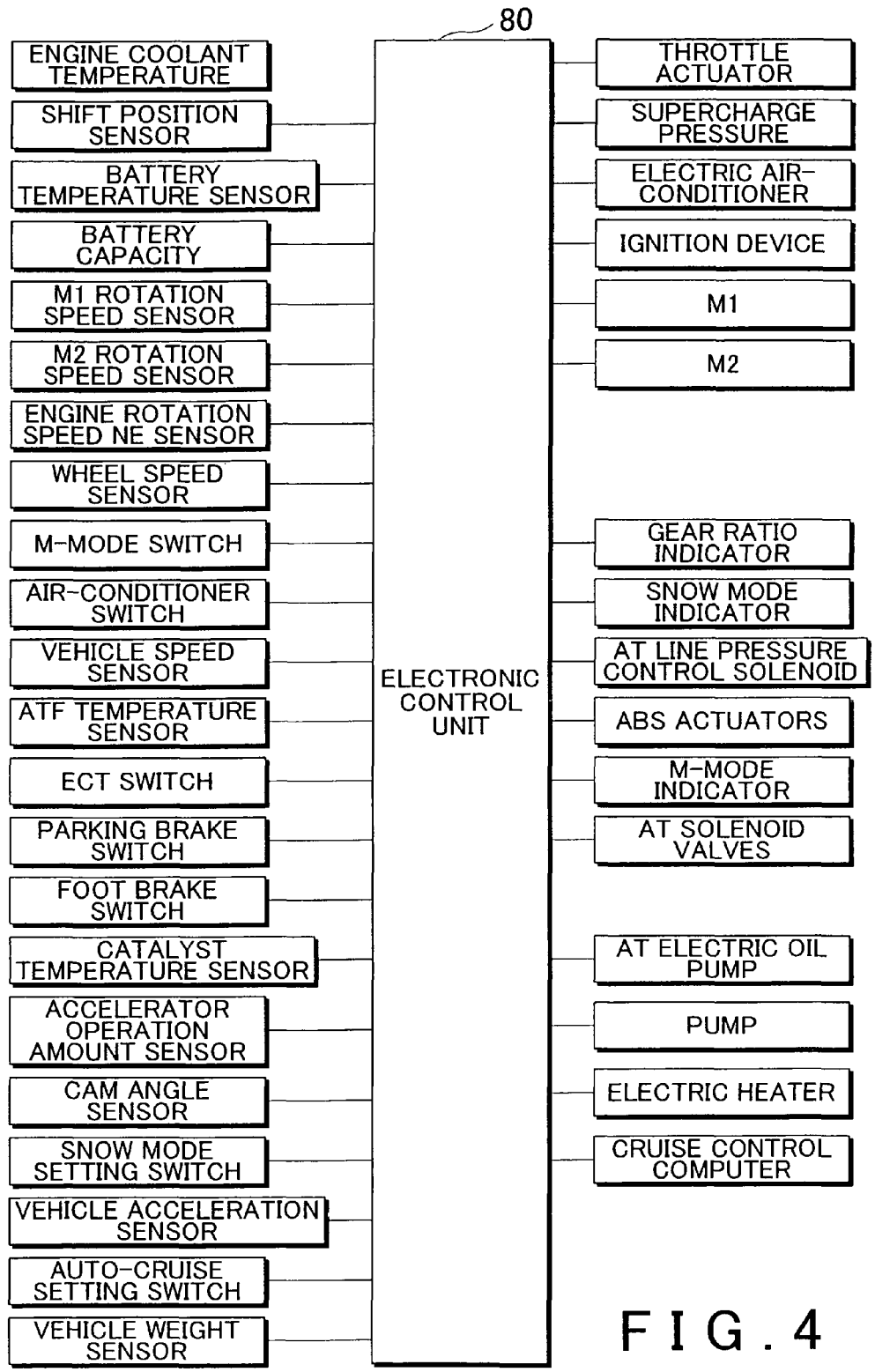
FIG. 4 is a diagram illustrating input/output signals of an electronic control unit provided in an embodiment of the vehicle power transmission device shown in FIG. 1.

FIG. 4 shows an example of signals input to an electronic control unit 80 for controlling the transmission mechanism 10 in the first embodiment and signals output from the electronic control unit 80. This electronic control unit 80 includes a so-called microcomputer made up of a CPU, a ROM, a RAM, input/output interfaces, etc. By performing signal processing in accordance with programs pre-stored in the ROM while utilizing the temporary storage function of the RAM, the electronic control unit 80 executes driving controls, such as hybrid drive controls regarding the engine 8 and the first and second electric motors M1, M2, the ratio shift control of the automatic ratio shift portion 20, etc.

The electronic control unit 80 is supplied from various sensors, switches, etc., with signals, including a signal representing the engine coolant temperature TEMPW, a signal representing the shift position PSH of a shift lever 52 (see FIG. 6), the number of times of operation at the "M" position, etc., a signal representing the engine rotation speed NE, that is, the rotation speed of the engine 8, a signal commanding an M mode (manual shift travel mode), a signal representing the operation of an airconditioner, a signal representing the rotation speed NOUT of the output shaft 22 corresponding to the vehicle speed V (hereinafter, referred to as "the output shaft rotation speed NOUT"), a signal representing the temperature THATF of automatic transmission fluid (hereinafter, referred to as "the ATF temperature THATF") that is used for a control operation of the automatic ratio shift portion 20, a signal representing the parking brake operation, a signal representing a foot brake operation, a signal representing the catalyst temperature, a signal representing the accelerator operation amount Acc, that is, the amount of operation of an accelerator pedal, which corresponds to a driver's requested output amount, a signal representing the cam angle, a signal representing the setting of a snow mode, a signal representing the longitudinal acceleration G of the vehicle, a signal representing the automatic cruise travel, a signal representing the weight of the vehicle (vehicle weight), a signal representing the wheel speed of each tire wheel, a signal representing the rotation speed NM1 of the first electric motor M1 (hereinafter, referred to as "the first electric motor rotation speed NM1"), a signal representing the rotation speed NM2 of the second electric motor M2 (hereinafter, referred to as "the second electric motor rotation speed NM2"), a signal representing the charged capacity (state of charge) SOC of an electricity storage device 56 (see FIG. 7), a signal representing the temperature of an electricity storage device 56, a signal representing the brake master cylinder pressure, that is, the output pressure of a brake master cylinder 110, etc.

The electronic control unit 80 outputs various signals, including control signals to an engine output control device 58 (see FIG. 7) that controls the engine output, for example, a drive signal to a throttle actuator 64 that manipulates the throttle valve opening degree θTH of an electronic throttle valve 62 provided in an intake pipe 60 of the engine 8, a fuel supply amount signal that controls the amount of fuel supplied by a fuel injection device 66 into an intake pipe 60 or each cylinder of the engine 8, or an ignition signal that commands the timing of the ignition performed by an ignition device 68 in the engine 8, a supercharge pressure adjustment signal for adjusting the supercharge pressure, an electric air-conditioner drive signal for operating an electric air-conditioner, a command signal that commands the operation of the electric motors M1 and M2, a shift position (operation position) display signal for operating a shift indicator, a gear ratio display signal for displaying the gear ratio, a snow mode display signal for displaying that the snow mode is on, an ABS operation signal for operating an ABS actuator that prevents slippage of wheels during braking, an M-mode display signal that displays that the M mode has been selected, a valve command signal that operates electromagnetic valves (linear solenoid valves) that are included in a hydraulic control circuit 70 (see FIG. 5 and FIG. 7) in order to control the hydraulic actuators of hydraulic type friction engagement devices provided for the differential motion portion 11 or the automatic ratio shift portion 20, a signal for adjusting a line oil pressure PL through the use of a regulator valve (pressure regulating valve) provided in the hydraulic control circuit 70, a drive command signal for operating an electric hydraulic pump that is an oil pressure source of a basic pressure from which the line oil pressure PL is adjusted, a signal for driving an electric heater, a signal to a computer for the cruise control, an output restraint information signal for informing a driver that the output of the drive force source (hereinafter, referred to as "the drive force source output") is being restrained; for example, the engine output (power) and/or the output of the second electric motor M2 (hereinafter, referred to as "the second electric motor output") are being restrained, etc.

Figure 5:
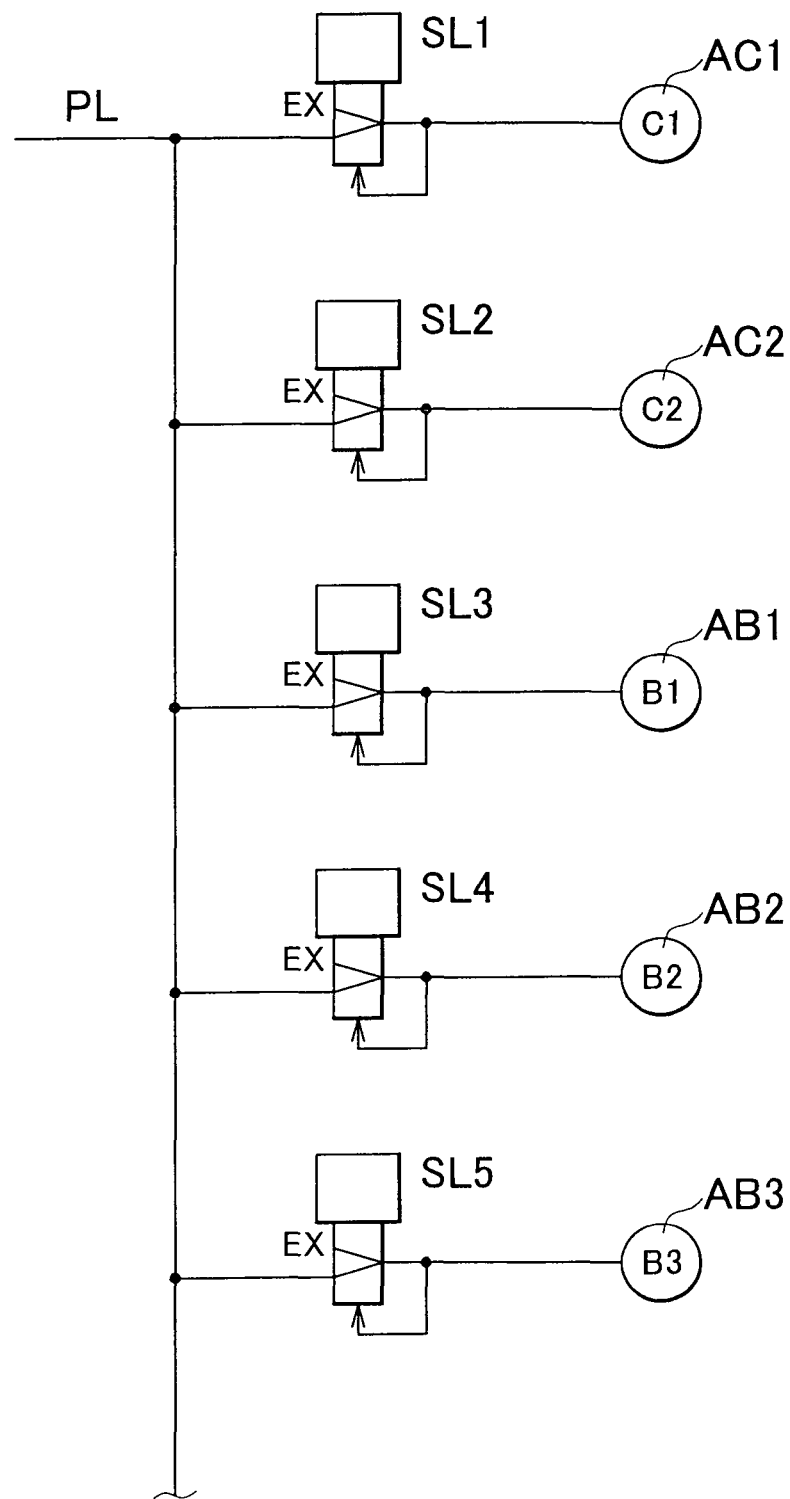
FIG. 5 is a circuit diagram regarding linear solenoid valves that control the operations hydraulic actuators of clutches and brakes in a hydraulic control circuit.

FIG. 5 is a hydraulic circuit diagram regarding linear solenoid valves SL1 to SL5 that control the operations of hydraulic actuators (hydraulic cylinders) AC1, AC2, AB1, AB2, AB3 of the clutches C1, C2 and the brakes B1 to B3 in the hydraulic control circuit 70.

In FIG. 5, the hydraulic actuators AC1, AC2, AB1, AB2, AB3 are directly supplied with engagement pressures PC1, PC2, PB1, PB2, PB3, respectively, that are adjusted from the line oil pressure PL by the linear solenoid valves SL1 to SL5 according to the command signals from the electronic control unit 80. The line oil pressure PL is adjusted by, for example, a relief-type pressure regulating valve (regulator valve), from the basic pressure that is an oil pressure produced by an electric oil pump (not shown) or a mechanical oil pump (not shown) that is rotationally driven by the engine 8, to a value according to the engine load or the like represented by the accelerator operation amount Acc or the throttle valve opening degree θTH.

The linear solenoid valves SL1 to SL5 basically have the same construction, and are independently energized or de-energized by the electronic control unit 80 so that the oil pressures of the hydraulic actuators AC1, AC2, AB1, AB2, AB3 are independently adjusted and controlled to control the engagement pressures PC1, PC2, PB1, PB2, PB3 of the clutches C1, C2 and the brakes B1, B2, B3. Then, in the automatic ratio shift portion 20, predetermined engagement devices are engaged, for example, as shown in the engagement operation table of FIG. 2, to establish an appropriate one of the speed change steps. Besides, in the ratio shift control of the automatic ratio shift portion 20, for example, a so-called clutch-to-clutch shift in which the release and the engagement of the clutches C or brakes B involved in the ratio shift are simultaneously controlled is executed.

Figure 6:
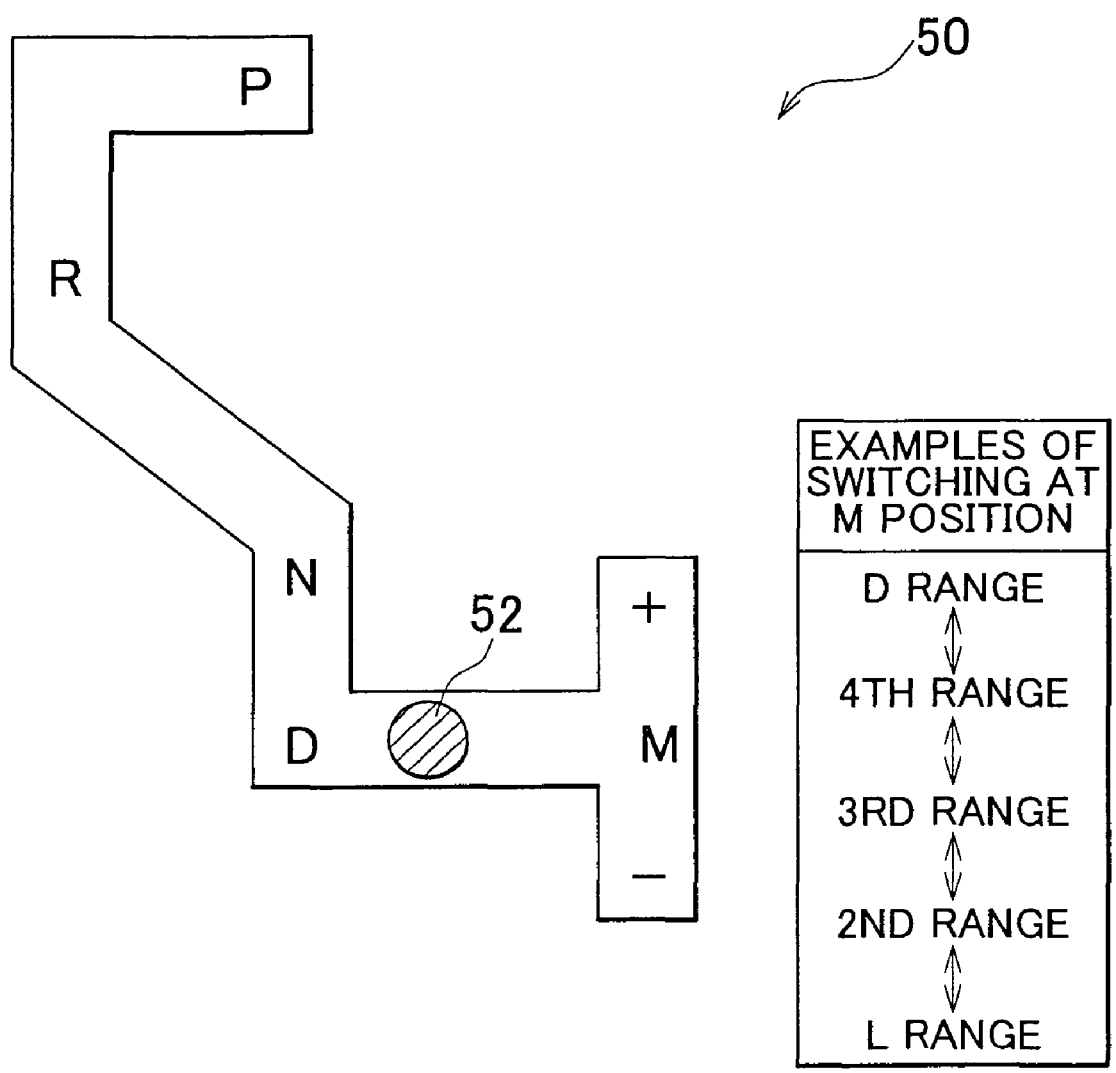
FIG. 6 shows an example of a shift operation device provided with a shift lever that is operated in order to select any one of a plurality of kinds of shift positions.

FIG. 6 is a diagram showing an example of a shift operation device 50 as a switch device for switching among a plural kinds of shift positions PSH by manual operation. This shift operation device 50 includes a shift lever 52 that is disposed, for example, at a side of a driver's seat, and that is operated in order to select an appropriate one of the plural kinds of shift positions PSH.

The shift lever 52 is provided so as to be manually operated to a parking position "P (Parking)" for bringing about a neutral state in which the power transmission path in the transmission mechanism 10, that is, in the automatic ratio shift portion 20, is cut off, and for locking the output shaft 22 of the automatic ratio shift portion 20, a reverse travel position "R (Reverse)" for reverse travel, a neutral position "N (Neutral)" for bringing about a neutral state in which the power transmission path in the transmission mechanism 10 is cut off, a forward travel automatic shift position "D (Drive)" for establishing an automatic shift mode of executing an automatic ratio shift control within the range of change of the total speed change ratio γT that can be achieved by the transmission mechanism 10 from the stepless speed change ratio width of the differential motion portion 11 and the automatic shift-controlled gear steps, that is, the first to fourth speed gear steps, of the automatic ratio shift portion 20, or a forward travel manual shift position "M (Manual)" for establishing a manual shift travel mode (manual mode) of setting a so-called shift range that restricts the high speed-side speed change steps in the automatic ratio shift control of the automatic ratio shift portion 20.

In concert with the manual operation of the shift lever 52 to any of the shift positions PSH, the hydraulic control circuit 70, for example, is electrically switched so as to establish a corresponding one of the reverse travel gear step "R", the neutral "N", the various speed change steps of the forward travel gear steps "D", etc.

Of the shift positions PSH shown as the "P" to "M" positions in the above-description, the "P" position and the "N" position are non-travel positions each of which is selected when the vehicle is not to be run, and are also non-driving positions for selecting a switch of the power transmission pathway to a power transmission cut-off state based on the first clutch C1 and the second clutch C2 in which the vehicle cannot be driven as the power transmission path in the automatic ratio shift portion 20 is cut off; that is, both the first clutch C1 and the second clutch C2 are released, as shown in the engagement operation table of FIG. 2. Besides, the "R" position, the "D" position and the "M" position are travel positions each of which is selected when the vehicle is to be run, and are driving positions for selecting a switch of the power transmission pathway to a power transmission-capable state based on the first clutch C1 and/or the second clutch C2 in which the vehicle can be driven as the power transmission path in the automatic ratio shift portion 20 is connected; that is, at least one of the first clutch C1 and the second clutch C2 is engaged, as shown in the engagement operation table of FIG. 2.

Concretely, when the shift lever 52 is manually operated from the "P" position or the "N" position to the "R" position, the second clutch C2 is engaged, so that the power transmission path in the automatic ratio shift portion 20 is changed from the power transmission cut-off state to the power transmission-capable state. When the shift lever 52 is manually operated from the "N" position to the "D" position, at least the first clutch C1 is engaged, so that the power transmission path in the automatic ratio shift portion 20 is changed from the power transmission cut-off state to the power transmission-capable state. Besides, when the shift lever 52 is manually operated from the "R" position to the "P" position or the "N" position, the second clutch C2 is released, so that the power transmission path in the automatic ratio shift portion 20 is changed from the power transmission-capable state to the power transmission cut-off state. When the shift lever 52 is manually shifted from the "D" position to the "N" position, the first clutch C1 and the second clutch C2 are released, so that the power transmission path in the automatic ratio shift portion 20 is changed from the power transmission-capable state to the power transmission cut-off state.

Figure 7:
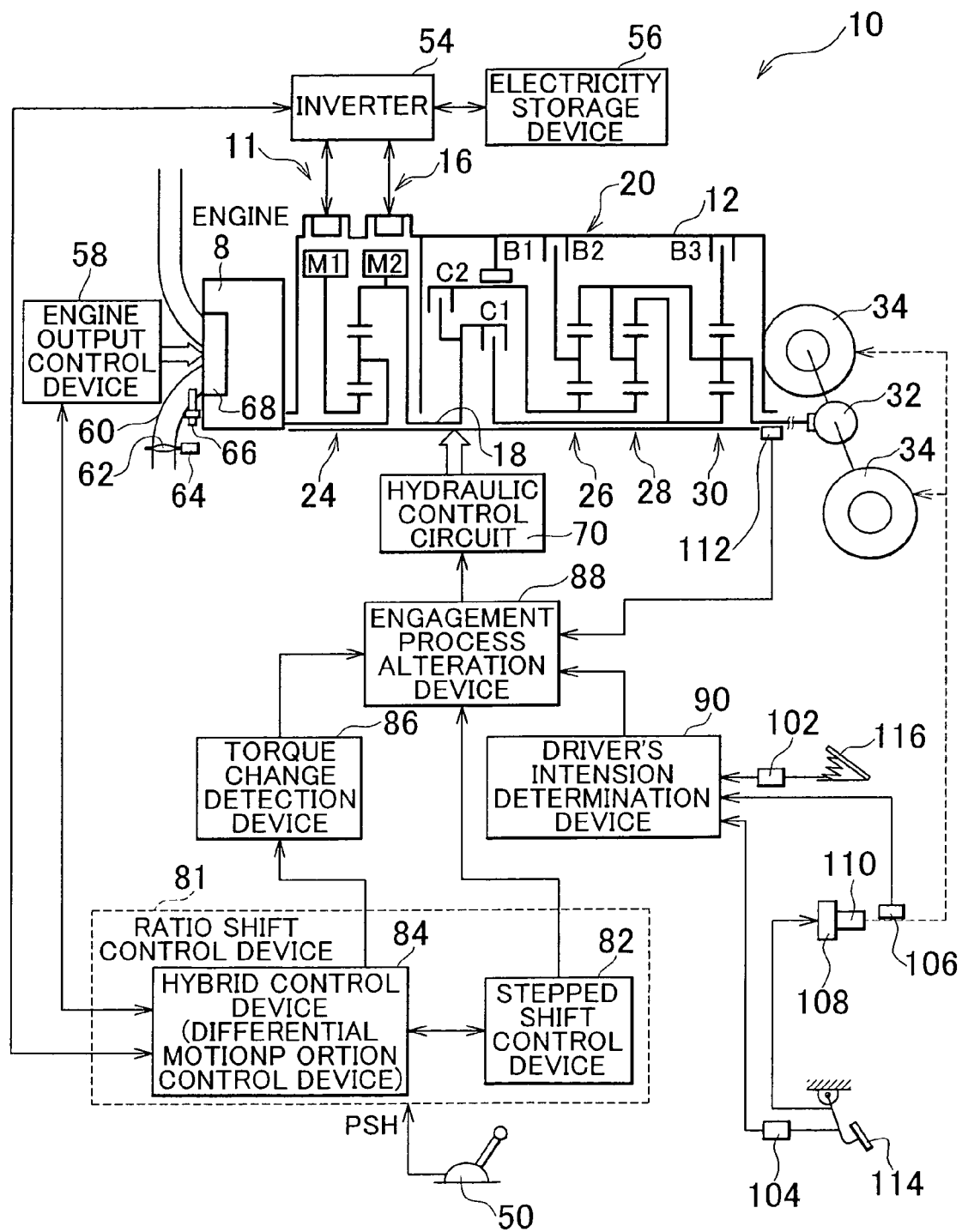
FIG. 7 is a functional block diagram illustrating portions of the control functions of the electronic control unit shown in FIG. 4.
Figure 8:
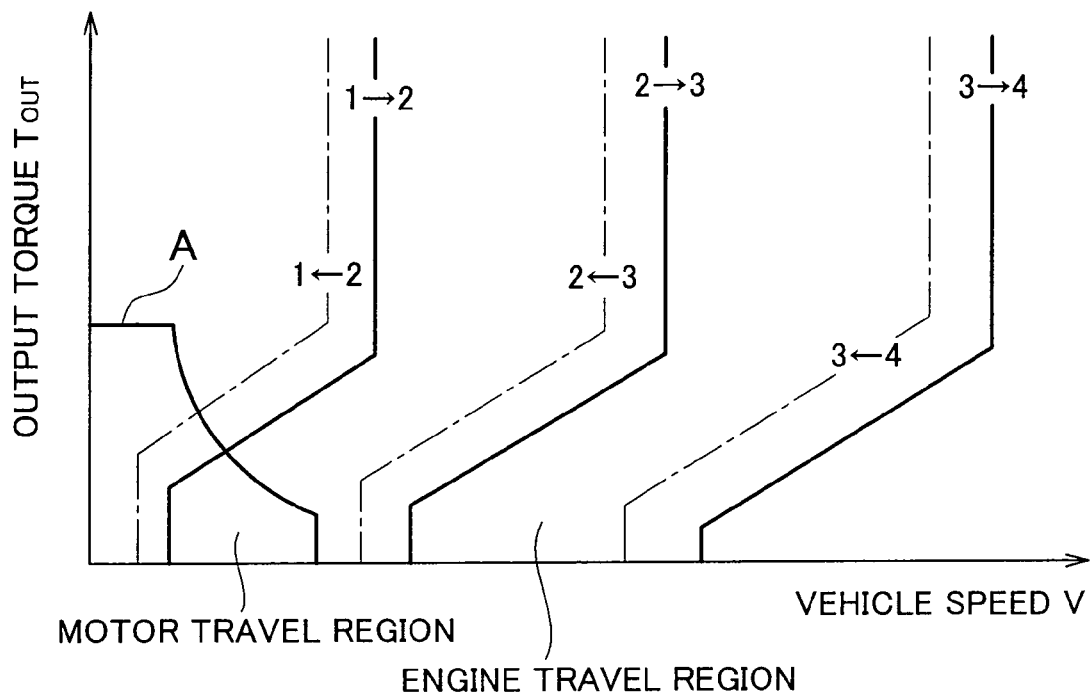
FIG. 8 is a diagram showing an example of a shift map used in the ratio shift control of a driving device, and an example of s drive force source map used in a drive force source switch control of switching the travel of the vehicle between the engine travel and the motor travel, and also showing relations therebetween.

FIG. 7 is a functional block diagram illustrating portions of the control functions performed by the electronic control unit 80. In FIG. 7, a stepped ratio shift control device 82 determines whether or not to execute a ratio shift of the automatic ratio shift portion 20, that is, determines the speed change step to which the automatic ratio shift portion 20 is to be shifted, on the basis of the state of the vehicle shown by the actual vehicle speed V and the requested output torque TOUT of the automatic ratio shift portion 20 in a pre-stored relationship (a shift chart, a shift map) including an upshift line (solid line) and a downshift line (dashed one-dotted line) which is represented by using, as variables, the vehicle speed V and the output torque TOUT of the automatic ratio shift portion 20 as shown in FIG. 8. Then, the stepped ratio shift control device 82 executes an automatic ratio shift control of the automatic ratio shift portion 20 so that the determined speed change step will be obtained.

At this time, the stepped ratio shift control device 82 outputs to a hydraulic control circuit 70 a command to engage and/or release the hydraulic type friction engagement devices involved in the ratio shift of the automatic ratio shift portion 20 (a ratio shift output command, an oil pressure command), that is, a command to execute a clutch-to-clutch shift by releasing the release-side engagement device involved in the ratio shift of the automatic ratio shift portion 20 and engaging the engagement-side engagement device involved in the ratio shift of the automatic ratio shift portion 20. The hydraulic control circuit 70, following the command, operates the hydraulic actuators of the hydraulic type friction engagement devices involved in the ratio shift by operating the corresponding linear solenoid valves SL in the hydraulic control circuit 70 so that, for example, the release-side engagement device is released and the engagement-side engagement device is engaged to carry out the ratio shift of the automatic ratio shift portion 20.

Figure 14:
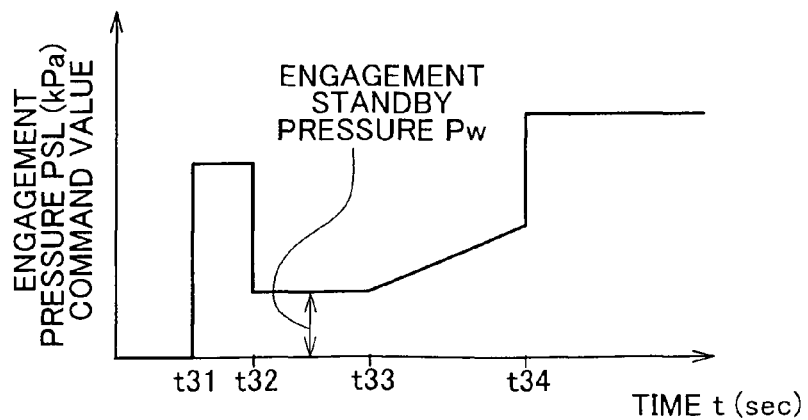
FIG. 14 is an example of a time chart representing time-dependent changes of the command value of the engagement pressure at the time of engagement of friction engagement element devices of the automatic ratio shift portion in the case where the invention is not applied.

FIG. 14 is a time chart showing an example of the process of engagement of a friction engagement device that is commonly used. In FIG. 14, the horizontal axis represents time t (sec), and the vertical axis represents the command value of the engagement pressure PSL (kPa) that is the oil pressure supplied to the friction engagement device.

The stepped ratio shift control device 82 makes a ratio shift determination, and outputs a command for engagement to a friction engagement device that is to be engaged. Specifically, at a time t31, the oil pressure starts to be supplied to the friction engagement device that is to be engaged according to the determined ratio shift. Firstly, for the period of the time t31 to a time t32, such a high engagement pressure that the working oil is rapidly charged is designated in order to quickly eliminate the back clearance of the friction engagement device (i.e., a fast-fill control is execute). Subsequently at the time t32, an engagement standby pressure PW that is an engagement pressure lower than the high engagement pressure is designated. The engagement standby pressure PW is maintained for a predetermined time. The standby with the engagement standby pressure PW is performed for the following reason. That is, if the engagement is started with the high engagement pressure set for the fast-fill control, a shock occurs. In order to avoid the shock, a lower engagement pressure is designated at the time point of starting the engagement. After that, at a time t33, the engagement of the friction engagement device is started, and the command value of the engagement pressure PSL is gradually raised. Then, at a time t34 when the command value of the engagement pressure reaches a predetermined value, an engagement pressure corresponding to a completely engaged state of the friction engagement device is designated. In addition, the period from the time t31 to the time t34 is termed the period of switching from the non-engaged state to the engaged state.

At this time, the engagement standby pressure PW is determined on the basis of, for example, the input torque to the automatic ratio shift portion 20, that is, the torque of the transmission member 18. Concretely, the engagement standby pressure PW is set at a large value within such a magnitude that the engagement of the friction engagement device is not started. Therefore, if the input torque to the automatic ratio shift portion 20 is a large value, the engagement standby pressure PW is caused to be a small value. If the input torque to the automatic ratio shift portion 20 is a small value, the engagement standby pressure PW is caused to be a large value.

The hybrid control device 84 functions as a differential motion portion control device, and operates the engine 8 in a high-efficiency operation region, and also controls the speed change ratio γ0 of the differential motion portion 11 as an electric continuously variable transmission by changing the distribution of drive force between the engine 8 and the second electric motor M2 and the reaction force caused by the power generation of the first electric motor M1 in an optimum fashion. For example, given a present traveling vehicle speed V, a target (requested) output of the vehicle is calculated from the vehicle speed V and the accelerator operation amount Acc as a driver's requested output amount. From the target output of the vehicle and the requested charge value, a necessary total target output is calculated. Then, taking into account the transmission loss, the accessory load, the assist torque of the second electric motor M2, etc., a target engine output is calculated so that the foregoing total target output will be obtained. Then, the engine 8 is controlled so as to produce an engine rotation speed NE and an engine torque TE that achieve the target engine output, and the amount of electric power generation of the first electric motor M1 is controlled.

Thus, the overall speed change ratio γT that is the speed change ratio of the transmission mechanism 10 as a whole is determined by the speed change ratio γ0 of the differential motion portion 11 controlled by the hybrid control device 84 and the speed change ratio γ of the automatic ratio shift portion 20 controlled by the stepped ratio shift control device 82. Therefore, the stepped ratio shift control device 82 and the hybrid control device 84 combined can be regarded as a ratio shift control device 81. On the basis of the signal PSH representing the shift position which is output from the shift operation device 50 in response to the driver's operation of the shift lever 52, the ratio shift control device 81 changes the overall speed change ratio γT of the transmission mechanism 10 within, for example, the range of shift corresponding to the shift position PSH.

Figure 9:
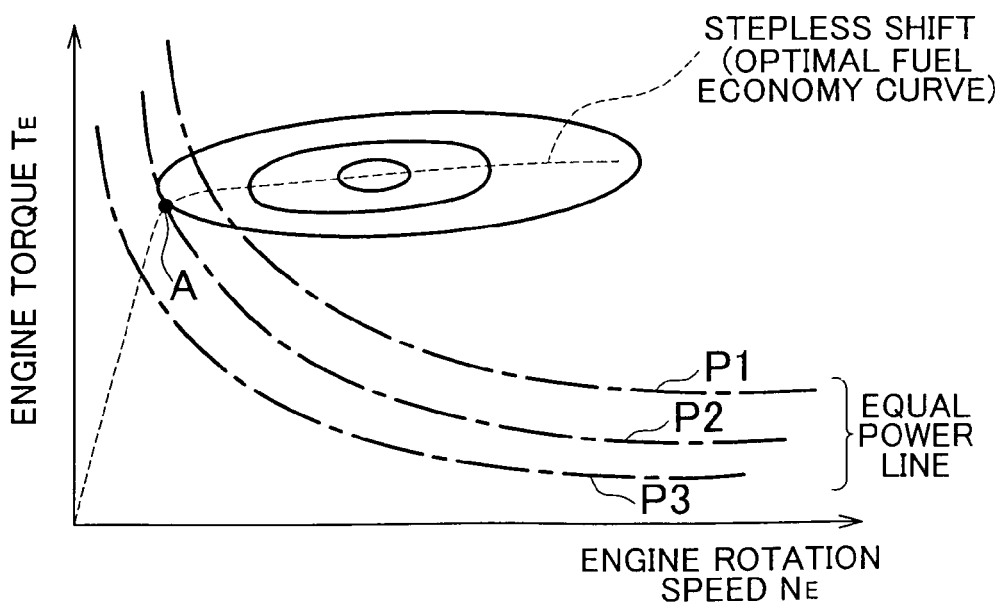
FIG. 9 is an example of a fuel economy map, in which an interrupted line is an optimum specific fuel consumption curve of the engine.

For example, the hybrid control device 84 executes the control, by factoring in the speed change step of the automatic ratio shift portion 20 for the purpose of improving the power performance, the fuel economy, or the like. In this hybrid control, the differential motion portion 11 is caused to function as an electric continuously variable transmission in order to achieve conformity between the engine rotation speed NE determined in order to operate the engine 8 in a high-efficiency operation region and the rotation speed of the transmission member 18 determined by the vehicle speed V and the speed change step of the automatic ratio shift portion 20. Specifically, the hybrid control device 84 determines a target value of the total speed change ratio γT of the transmission mechanism 10 such that the engine 8 is operated following a pre-stored optimum specific fuel consumption curve (fuel economy map) of the engine 8 as shown by an interrupted line in FIG. 9 which is empirically determined beforehand so that both good operation characteristic and good fuel economy can be achieved during the stepless-ratio-shift travel of the vehicle in a two-dimensional coordinate system constructed of the engine rotation speed NE and the output torque (engine torque) TE of the engine 8, for example, such that an engine torque TE and an engine rotation speed NE for achieving the engine output that is needed in order to achieve the target output (the total target output, the requested drive force) will be obtained. Taking into account the speed change step of the automatic ratio shift portion 20, the speed change ratio γ0 of the differential motion portion 11 is controlled so that the target value will be obtained. In this manner, the total speed change ratio γT is controlled steplessly within the range of change in which the ratio can be shifted.

At this time, the hybrid control device 84 supplies the electric energy generated by the first electric motor M1 to the electricity storage device 56 or the second electric motor M2 through an inverter 54. Therefore, while a major portion of the power of the engine 8 is mechanically transmitted to the transmission member 18, a portion of the power of the engine 8 is consumed for the electric power generation by the first electric motor M1, and is thereby converted into electric energy, which is supplied to the second electric motor M2 through the inverter 54, so that the second electric motor M2 is driven and the motive power output by the second electric motor M2 is transmitted to the transmission member 18. The devices or the like involved in a process from the generation of electric energy to the consumption thereof by the second electric motor M2 form an electric path in which a portion of the power of the engine 8 is converted into electric energy and then the electric energy is converted into mechanical energy.

In particular, in the case where the ratio shift control of the automatic ratio shift portion 20 is executed by the stepped ratio shift control device 82, the total speed change ratio γT of the transmission mechanism 10 is changed stepwise before, when and after the speed change ratio of the automatic ratio shift portion 20 is changed stepwise. Since the total speed change ratio γT changes stepwise, that is, since the speed change ratio does not continuously change, but jumps, the drive torque can be changed quickly in comparison with the continuous changing of the total speed change ratio γT. However, there is a possibility of occurrence of a shift shock, or a possibility of the fuel economy deteriorating as the engine rotation speed NE cannot be controlled so as to be along an optimum specific fuel consumption curve.

Therefore, the hybrid control device 84 executes a ratio shift of the differential motion portion 11 so that the ratio shift of the differential motion portion 11 changes in a direction opposite to the direction of change in the speed change ratio of the automatic ratio shift portion 20 synchronously with the ratio shift of the automatic ratio shift portion 20, in such a manner that the stepwise change of the total speed change ratio γT is restrained. In other words, the hybrid control device 84 executes the ratio shift control of the differential motion portion 11 synchronously with the ratio shift control of the automatic ratio shift portion 20 so that the total speed change ratio γT of the transmission mechanism 10 continuously changes before, when and after the automatic ratio shift portion 20 is shifted in the transmission ratio. For example, in order to transitionally form such a predetermined total speed change ratio γT of the transmission mechanism 10 that the total speed change ratio γT does not change before and after the ratio shift of the automatic ratio shift portion 20, the hybrid control device 84, synchronously with the ratio shift control of the automatic ratio shift portion 20, executes the ratio shift control of the differential motion portion 11 so that the speed change ratio is changed stepwise by an amount of change that corresponds to a stepwise change of the speed change ratio of the automatic ratio shift portion 20, in a direction opposite to the direction of change of the speed change ratio of the automatic ratio shift portion 20.

From another standpoint, when the ratio shift of the automatic ratio shift portion 20 is executed so that the speed change ratio of the automatic ratio shift portion 20 is changed stepwise, the hybrid control device 84 controls the speed change ratio γ0 of the differential motion portion 11 so that the point of operation of the engine 8 does not change before and after the ratio shift of the automatic ratio shift portion 20. For example, in FIG. 9, curves P1, P2, P3 are an example of equal power lines P of the engine 8, and a point A is an example of the point of operation of the engine 8, that is, the state of drive of the engine 8, that is defined by the engine rotation speed NE and the engine torque TE that are set on the basis of the fuel consumption efficiency (optimum specific fuel consumption) of the engine 8 when a necessary engine output P2 is produced. Then, the hybrid control device 84 executes a so-called equal-power ratio shift in which the differential motion portion 11 is ratio-shifted so that before and after the ratio shift of the automatic ratio shift portion 20, the point of operation of the engine 8 as shown by the point A does not change, or remains on the equal power line, that is, the point of operation of the engine 8 is along the optimum specific fuel consumption curve, and the power is kept equal. More concretely, during the ratio shift of the automatic ratio shift portion 20, the hybrid control device 84 executes a throttle control so that the engine torque TE is kept substantially constant, and the hybrid control device 84 also changes the first electric motor rotation speed NM1 in a direction opposite to the direction of the change of the second electric motor rotation speed NM2 associated with the ratio shift of the automatic ratio shift portion 20 so that the engine rotation speed NE is kept substantially constant.

Furthermore, regardless of whether the vehicle is at a stop or is running, the hybrid control device 84 is able to control the engine rotation speed NE to a substantially constant speed or arbitrary speeds by controlling, for example, the first electric motor rotation speed NM1, through the use of the electric CVT function of the differential motion portion 11. In other words, the hybrid control device 84 is able to control the first electric motor rotation speed NM1 to arbitrary rotation speeds while controlling the engine rotation speed NE at a substantially constant speed or arbitrary rotation speeds. For example, as can be seen from the alignment chart of FIG. 3, when the engine rotation speed NE is to be raised while the vehicle is running, the hybrid control device 84 raises the first electric motor rotation speed NM1 while keeping substantially constant the second electric motor rotation speed NM2 that is restrained by the vehicle speed V (the driving wheels 34).

Furthermore, the hybrid control device 84 controls the engine output control device 58. That is, the hybrid control device 84 outputs to the engine output control device 58 one of or a combination of commands to control the opening and closing of the electronic throttle valve 62 by using the throttle actuator 64 for the throttle control, and control the amount of fuel injection and the timing of fuel injection from the fuel injection device 66 for the fuel injection control, and control the ignition timing of the ignition device 68, such as an igniter or the like, for the ignition timing control. The engine output control device 58 executes the output control of the engine 8 so that a necessary engine output is produced.

For example, the engine output control device 58, following a command from the hybrid control device 84, drives the throttle actuator 64 basically on the basis of the accelerator operation amount Acc from the pre-stored relationship (not shown), and thus executes the throttle control so that the throttle valve opening degree θTH increases as the accelerator operation amount Acc increases. In addition to executing the control of opening or closing the electronic throttle valve 62 via the throttle actuator 64 for the throttle control, the engine output control device 58 controls the fuel injection by the fuel injection device 66 for the fuel injection control, and also controls the ignition timing by the ignition device 68, such as an igniter or the like, for the ignition timing control, etc., thereby executing an engine torque control, in accordance with another command from the hybrid control device 84.

Furthermore, the hybrid control device 84 is able to cause a motor travel of the vehicle by the electric CVT function (differential motion effect) of the differential motion portion 11, regardless of whether the engine 8 is at a stop or in an idling state.

For example, using a pre-stored relationship (a drive force source switch diagram, a drive force source map) involving a border line between the engine travel region and the motor travel region defined for switching the vehicle-running drive force source between the engine 8 and the second electric motor M2 which is represented by using the vehicle speed V and the output torque TOUT of the automatic ratio shift portion 20 as shown in FIG. 8, the hybrid control device 84 determines whether the present vehicle travel region is the motor travel region or the engine travel region, and accordingly executes the motor travel or the engine travel of the vehicle, on the basis of the state of the vehicle that is shown by the actual vehicle speed V and the requested output torque TOUT of the automatic ratio shift portion 20 in the relationship. The drive force source shown by a solid line A in FIG. 8 is pre-stored together with a ratio shift map shown by solid lines and dashed one-dotted lines in FIG. 8. Thus, the motor travel caused by the hybrid control device 84 is executed in a relatively low output torque TOUT region, that is, a low engine torque TE region, in which the engine efficiency is generally considered low in comparison with a high torque region, or in a relatively low vehicle speed region in which the vehicle speed V is relatively low, that is, a low load region.

During the motor travel, in order to improve the fuel economy by restraining the dragging of the stopped engine 8, the hybrid control device 84 keeps the engine rotation speed NE at zero or substantially zero, if necessary, due to the electric CVT function (differential motion effect) of the differential motion portion 11, by controlling the first electric motor rotation speed NM1 at a negative rotation speed so that, for example, the first electric motor M1 is put into a no-load state, and therefore into a freewheeling state.

Furthermore, even during the engine travel region, the hybrid control device 84 is able to perform a so-called torque assist for supplementing the power of the engine 8 by supplying the second electric motor M2 with the electric energy from the electricity storage device 56 and/or the electric energy from the first electric motor M1 via the aforementioned electric path and therefore driving the second electric motor M2 to apply torque to the driving wheels 34.

Furthermore, the hybrid control device 84 is able to bring about a state in which the differential motion portion 11 is unable to transmit torque, that is, a state that is substantially the same as the state in which the power transmission path within the differential motion portion 11 is cut off and that is also a state in which no output is produced from the differential motion portion 11, by putting the first electric motor M1 into the no-load state so that the first electric motor M1 freely rotates, that is, freewheels. That is, the hybrid control device 84 is able to put the differential motion portion 11 into a neutral state in which the power transmission path of the differential motion portion 11 is electrically cut off, by putting the first electric motor M1 into a non-load state.

Thus, in the drive force source map as shown in FIG. 8, the motor travel region is a relatively low torque output torque TOUT that is generally considered to allow lower engine efficiency than a high torque region, or a relatively low vehicle speed V region, that is, the motor travel is executed in a low load region. Besides, although not shown in FIG. 8, in the case of the "R" position, that is, where the vehicle is reversed, the vehicle is run by the motor without the use of the engine, since the vehicle speed is relatively low when the vehicle is reversed. Therefore, for example, at the time of a garage shift (N→D shift, N→R shift or P→R shift) in which the shift lever 52 is operated from the "N" position to the "D" position or the "R" position at the time of a predetermined low vehicle speed or stop of the vehicle, the hybrid control device 84 causes the vehicle to travel by the power from the electric motor not from the engine.

Incidentally, during a state in which the state of charge SOC of a storage battery 56 is low, or in the case where the engine 8 needs a warm-up operation, the hybrid control device 84 starts up the engine 8 even in the case where it has been determined that the motor travel should be performed from the drive force source map represented by the line A in FIG. 8. That is, the engine 8 is sometimes driven even when the output of the engine 8 is not used to drive the vehicle.

In such a case, the hybrid control device 84 controls the first electric motor M1 so as to generate electric power so that the rotation speed of the first ring gear R1 (the third rotating element RE3) rotated by the second electric motor M2 is not affected, that is, so that the rotation speed does not change, or controls the first electric motor M1 so that the first electric motor M1 is put into the no-load state, and therefore freewheels, so that in the differential motion portion 11, the power transmission is cut off, and the rotation speed of the first ring gear R1 (the third rotating element RE3) rotated by the second electric motor is not affected. However, even in the case where the first electric motor M1 is controlled in this manner, the rotation speed of the first ring gear R1 (third rotating element RE3), that is, the transmission member 18, is not absolutely unaffected, but is subject to a change. Particularly at the time of a garage shift, that is, a shift operation performed while the vehicle is traveling at low vehicle speed or is at a stop, such a change in the rotation speed can be a factor that causes a shock.

Therefore, a torque change detection device 86 detects a change in the input torque to the input shaft of the transmission mechanism 10, for example, on the basis of a command to start the engine 8 or a command to stop it from the hybrid control device 84. The engine start command or the engine stop command, for example, may be associated with the start or end of the warm-up operation of the engine 8 as described above, or may also be based on an electrical charging control of causing the first electric motor M1 to start electric power generation for the purpose of charging the electricity storage device 56 due to a declined state of charge thereof or the active charging for warm-up of the electricity storage device 56, or may also be based on an electrical discharge control for causing the discharge of the electricity storage device 56 for restraining the excessive SOC thereof or for performing active discharge for warm-up of the electricity storage device 56.

In the case where the shift lever 52 is operated in the manner of the garage shift from the "N" position or the "P" position that establishes the non-driving state of the vehicle to the "D" position or the "R" position that establishes the driving state of the vehicle, the stepped ratio shift control device 82 normally starts the engagement of the friction engagement devices corresponding to the selected range (e.g., the clutch C1 and the brake B3 in the case where the shift lever 52 is switched from the "N" position to the "D" position, and the first speed step is established), among the friction engagement devices provided in the automatic ratio shift portion 20, in accordance with, for example, the time chart shown in FIG. 14, on the assumption that in this case, a relatively small torque is input to the automatic ratio shift portion 20. At this time, the value of the engagement standby pressure PW is determined on the basis of the input torque to the automatic ratio shift portion 20 as described above. At the time of the garage shift, since it is normally the case that the accelerator pedal is not operated or the amount of operation of the accelerator pedal is very small and therefore the torque generated by the second electric motor M2 is relatively small, the engagement standby pressure PW is set at a relatively high pressure. In addition, in the case where the accelerator operation amount Acc is 0, that is, the accelerator pedal is not depressed, the second electric motor M2 produces a pseudo-creep torque that corresponds to the so-called creep torque, and therefore causes a pseudo-creep state. In this case, therefore, torque is input to the transmission member 18 even when the accelerator operation amount Acc is zero.

By the way, during the switch of the transmission mechanism 10 from the non-driving state to the driving state which is executed in association with the garage shift operation, the command values of the engagement pressure of the clutches and the brakes, which are the friction engagement devices, are output as shown FIG. 14, as described above. Consequently, during the switch from the non-engaged state to the engaged state, the actual engagement pressure is gradually raised, and the friction engagement device has an engagement capacity corresponding to the engagement pressure. Then, in the case where the input torque is within such a range that the engagement capacity is not exceeded, the friction engagement device assumes the engaged state. On the other hand, in the case where a torque exceeding the engagement capacity is input, the friction engagement device has a slip, so that no more torque transmission is performed. In addition, the period during which the transmission mechanism 10 is being switched from the non-driving state to the driving state refers to a period of time from a time point at which one of the release of the friction engagement device to be released at the time of the change of the transmission mechanism 10 from the non-driving state to the driving state and the engagement of the friction engagement device to be engaged at the time of the same change of the transmission mechanism 10 that is to first start to be performed starts to be performed to a time point at which one of the release of the friction engagement device to be released at the time of the change of the transmission mechanism 10 from the non-driving state to the driving state and the engagement of the friction engagement device to be engaged at the time of the same change of the transmission mechanism 10 that is to last finish being performed finishes being performed.

In the case where the engine 8 is started up, a change in input torque occurs in the transmission mechanism 10 and, particularly, in the automatic ratio shift portion 20. In the case where such a change in the input torque occurs during the period of the switch of the friction engagement device from the non-engaged state to the engaged state, a torque change that is smaller than a transmission capacity that is set such that a movement of the vehicle based on a garage shift can be sufficiently performed is transmitted to the driving wheels via the friction engagement device, so that a shock occurs on the vehicle.

Figure 11:
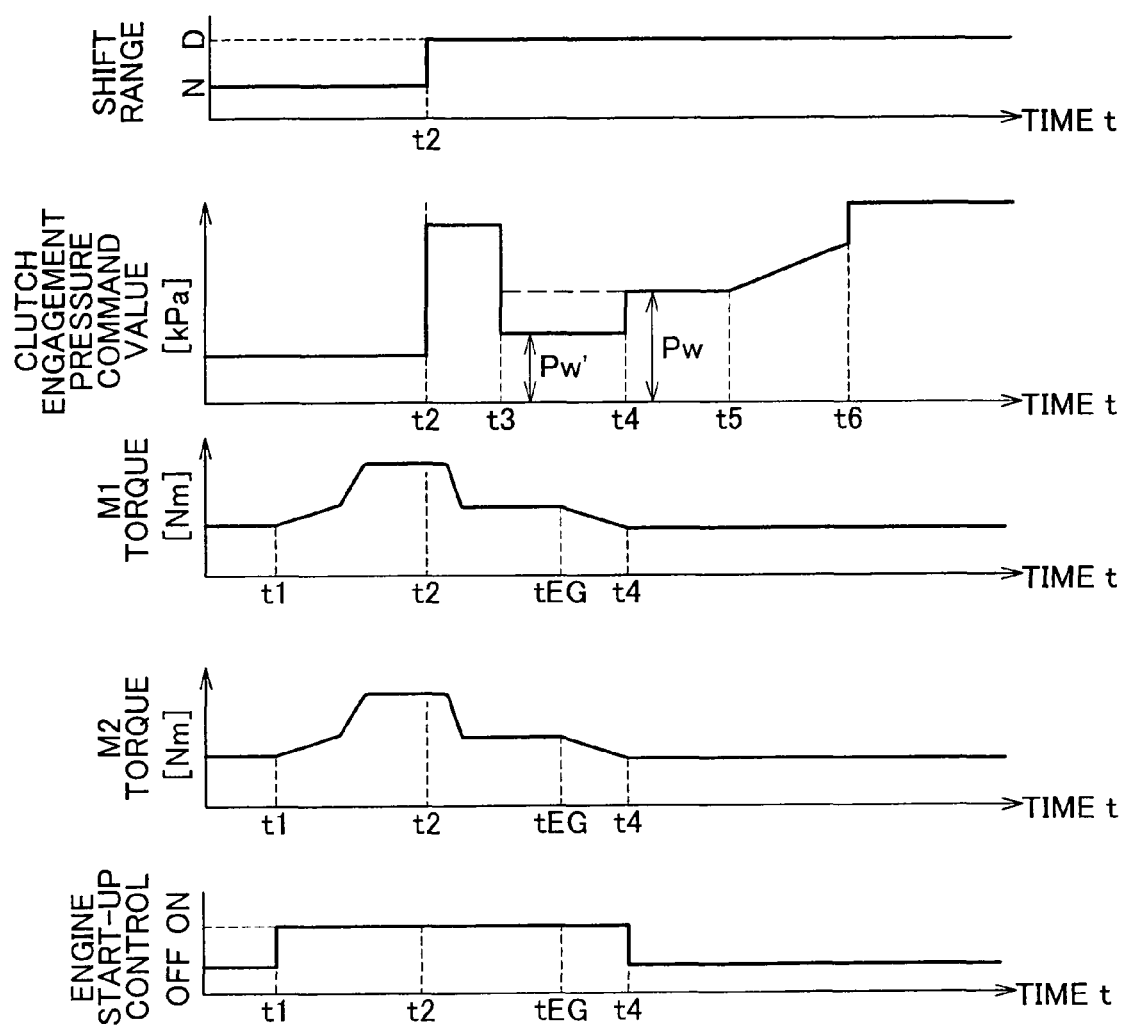
FIG. 11 is a time chart in the first embodiment illustrating the control operation shown in the flowchart of FIG. 10, in conjunction with a case where a start-up control of the engine is being performed in the case where a shift operation, for example, from the N range to the D range, is performed.

Therefore, in the case where a change in the torque input to the transmission mechanism 10 is detected by the torque change detection device 86 during the switch of the transmission mechanism 10 from the non-driving state to the driving state which is executed by the stepped ratio shift control device 82, an engagement process alteration device 88 alters the engagement standby pressure of the clutch as shown by the solid line in FIG. 11. That is, in order to reduce the influence that the change in input torque gives to the shift shock of the vehicle, at least a portion of the engagement process of the friction engagement devices that are engaged when the transmission mechanism 10 is switched from the non-driving state to the driving state (e.g., the clutch C1 and the brake B3 in the case where the first speed step of the automatic ratio shift portion 20 is established in the N→D garage shift), that is, at least a portion of the process of rise of the engagement torque or engagement oil pressure, is altered; for example, an ordinary engagement process as shown in FIG. 14 is altered to an engagement standby pressure as shown by a solid line in FIG. 11 which is different from the ordinary engagement process.

Concretely, for example, in the process of engagement of the friction engagement devices at the time of the switch of the transmission mechanism 10 from the non-driving state to the driving state (e.g., the clutch C1 and the brake B3 in the case where the first speed step of the automatic ratio shift portion 20 is established in the N→D garage shift), the engagement process alteration device 88 alters the value of the engagement standby pressure PW to a smaller value PW' (PW'<PW). Then, the value of the engagement standby pressure is kept at PW' until the end of the change in the input torque, and is returned to the previous value PW, for example, after the change in the input torque has ceased being detected by the torque change detection device 86. Specifically, by changing the value of the engagement standby pressure to the smaller-than-usual value PW', the engagement capacity of the friction engagement device is lessened. That is, by allowing a slip to occur with a lessened input torque, the influence of the change in the input torque giving a shock to the vehicle is reduced. At this time, if the post-alteration engagement standby pressure PW' is an excessively low value, for example, a minimum value that can be conceived as a command value, a great time lag occurs when the friction engagement device is engaged. Therefore, by setting the post-alteration engagement standby pressure PW' at a value that factors in the occurrence of time lag, for example, at a value close to the clutch piston stroke end pressure, the time lag can be reduced.

Of the cases where a change in the torque input to the transmission mechanism 10 is detected by the torque change detection device 86 during the switch of the transmission mechanism 10 from the non-driving state to the driving state executed by the stepped ratio shift control device 82, there are cases where the change in the input torque is due to, for example, a driver's operation on the accelerator, that is, the change in the input torque is based on the driver's intention to start moving the vehicle. If in such a case, the engagement process alteration device 88 alters the value of the engagement standby pressure PW, the behavior of the vehicle sometimes does not become what properly reflects the driver's intention. Therefore, the engagement process alteration device 88 is designed to execute the alteration of the value of the engagement standby pressure PW only in the cases where it is determined by a driver's intention determination device 90 (described below) that the driver's intention to start moving the vehicle is low.

Besides, in the case where although a change in the torque input to the transmission mechanism 10 is detected by the torque change detection device 86 during the switch of the transmission mechanism 10 from the non-driving state to the driving state executed by the stepped ratio shift control device 82, the vehicle speed, for example, detected by a vehicle speed sensor 112 as a vehicle speed-related value detection device, exceeds a predetermined value, it cannot be said that the present operation is based on the garage shift. It is considered that, in that case, priority should be given to the vehicle start response rather than to the reduction of a shock. Therefore, the engagement process alteration device 88 is designed to perform the foregoing function only in the case where the vehicle is in a stopped state or a very low vehicle speed state in which the vehicle speed detected by the vehicle speed sensor 112 is less than or equal to the predetermined value. In addition, the vehicle speed sensor 112 is, for example, a rotation sensor that detects the rotation speed of the output shaft of the vehicle power transmission device. The vehicle speed is calculated on the basis of the value detected by the rotation sensor, the gear ratio of the final speed reducer 32, the diameter of the driving wheels 34, etc.

The driver's intention determination device 90, corresponding to a vehicle start intention determination device, determines whether or not the driver has intended to start the vehicle, on the basis of whether or not the output of a sensor or switch provided in the vehicle reflects an operation performed by a driver to start the vehicle. Concretely, it is determined whether or not there is a driver's intention to start the vehicle on the basis of at least one of the accelerator operation amount Acc detected by an accelerator operation amount sensor 102 which corresponds to the amount of the driver's depression of an accelerator pedal 116, the output of a brake switch 104 for detecting whether a brake pedal 114 is being operated by the driver, and the output oil pressure of a brake master cylinder 110 detected by a master cylinder pressure sensor 106 which corresponds to the depression force on the brake pedal and the amount of depression (stroke) thereof each of which is the amount of braking operation that represents the driver's intention to brake and the degree of the braking. More concretely, it is determined that the driver has an intention to start the vehicle, if at least a predetermined one of the following conditions is satisfied: a condition that the accelerator operation amount Acc be greater than a predetermined value; a condition that the brake pedal 114 be not being operated; and a condition that the brake master cylinder pressure be below a predetermined value.

Figure 10:
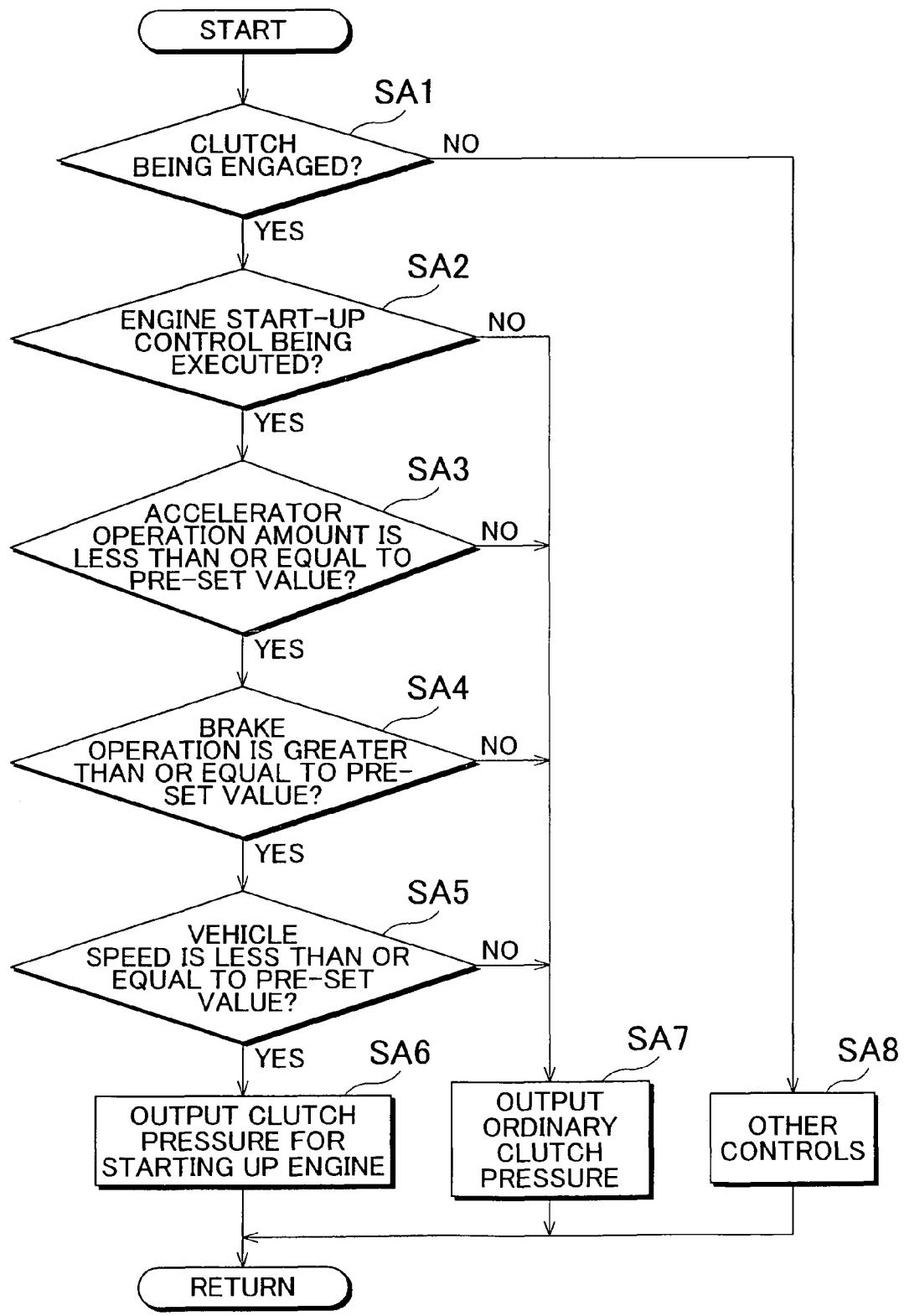
FIG. 10 is a flowchart in a first embodiment of the invention illustrating a control operation of the electronic control unit shown in FIG. 4, that is, a control operation for reducing the shift shock at the time of the switch of the automatic ratio shift portion from the non-driving state to the driving state.

FIG. 10 is a flowchart generally showing the operation of a control device of the vehicle power transmission device of the invention. Firstly in step SA1 (hereinafter, the "step" will be omitted) corresponding to the stepped ratio shift control device 82, it is determined whether or not the automatic ratio shift portion 20 is presently being switched from the non-driving state to the driving state, that is, whether or not the friction engagement device to be engaged during the switch of the automatic ratio shift portion 20 from the non-driving state to the driving state is presently being switched from the non-engaged state to the engaged state, when a determination about a ratio shift including the switch of the automatic ratio shift portion 20 from the non-driving state to the driving state has been made. Concretely, for example, in the case where the change from the N range to the D range is performed by the shift operation device 50 and the automatic ratio shift portion 20 is set at the first speed step from the N (neutral) state, the foregoing determination in SA1 is made on the basis of whether at least one of the clutch C1 and the brake B3 is being switched. This determination is performed on the basis of, for example, a prescribed time chart of a switch shown in FIG. 14, and the elapsed time after the shift determination has been made. Then, if an affirmative determination is made in this state, that is, if it is determined that the friction engagement device is being switched from the non-engaged state to the engaged state, the process from SA2 on is executed. On the other hand, if a negative determination is made in this step, for example, if all the friction engagement devices have been switched to the engaged state, controls other than the foregoing control, that is, the control of altering the engagement processes of the friction engagement device, are executed in SA8 in accordance with needs. Then, the flowchart ends.

In SA2, corresponding to the torque change detection device 86, it is determined whether or not a control for starting up the engine 8 (hereinafter, referred to as "the start-up control") is being performed, on the basis of, for example, whether or not it is determined by the hybrid control device 84 that the electricity storage device 56 needs to be charged due to a decline in the SOC, or whether or not it is determined that the warm-up operation of the engine 8 is needed due to a decline in the engine cooling water temperature. If an affirmative determination is made in this step, that is, if it is determined that the start-up control of the engine is being executed, the process of SA3 is executed. On the other hand, if a negative determination is made in this step, that is, if it is determined that the start-up control of the engine is not being executed, the engagement process of the friction engagement device is not altered. Then in SA7, the engagement of the friction engagement device is executed by an ordinary engagement process of the friction engagement device, that is, a prescribed engagement process, such as an engagement process shown in FIG. 14.

SA3 and SA4, which follow SA2, correspond to the driver's intention determination device 90. In SA3, it is determined whether or not the value of the accelerator operation amount Acc detected by the accelerator operation amount sensor 102 is less than or equal to a predetermined value. Subsequently in SA4, it is determined whether or not a predetermined brake operating has been performed. The determination that the predetermined brake operation has been performed herein means, for example, satisfaction of one of the condition that an operation of the brake pedal 114 detected by the brake switch 104 be performed, and the condition that the output oil pressure of the brake master cylinder 110 detected by the master cylinder pressure sensor 106 be greater than or equal to a predetermined value. Furthermore, in SA5, it is determined whether or not the vehicle speed detected by the vehicle speed sensor 112 that corresponds to the vehicle speed-related value detection device is less than or equal to a predetermined value. If an affirmative determination is made in each of the three steps, that is, SA3 to SA5, the process of SA6 is subsequently executed. On the other hand, if a negative determination is made in any one of the three steps, that is, SA3 to SA5, the alteration of the engagement process of the friction engagement device is not performed; instead, in SA7, the engagement of the friction engagement device is executed by an ordinary engagement process of the friction engagement device, that is, a prescribed engagement process, such as the engagement process shown in FIG. 14.

In SA6, corresponding to the engagement process alteration device 88, the process of engagement of the friction engagement devices to be engaged during the switch of the transmission mechanism 10 from the non-driving state to the driving state (e.g., the clutch C1 and the brake B3 in the case where the automatic ratio shift portion 20 is set at the first speed step in the N→D garage shift) is altered. Concretely, for example, the value of the engagement standby pressure PW in the engagement of the friction engagement devices is altered to a smaller value PW' (PW'<PW). Then, the value of the engagement standby pressure is kept at PW', for example, until the start-up control of the engine 8 ends.

FIG. 11 is an example of a time chart for describing the control operation of a control device of the vehicle power transmission device of the invention. FIG. 11 shows the operation of the shift operation device 50, the command value of the engagement pressure of the friction engagement device that is engaged by a shift operation, the output torque of the first electric motor M1, the output torque of the second electric motor M2, and the presence/absence of the start-up control of the engine along the vertical axis, together with time along the horizontal axes of the same scale.

At a time t1, a start-up control for starting up the engine 8, which has been caused to be at rest by the hybrid control device 84, is started on the basis of, for example, a decline of the SCO of the electricity storage device 56. Due to the start of the start-up control, the output torques of the first electric motor M1 and the second electric motor M2 are raised. The torque of the first electric motor M1 is raised in order to operate the first electric motor M1 as a starter motor of the engine 8 so as to cause the engine 8 to rotate at a rotation speed that allows the self-sustaining operation thereof, for example, about 600 rpm. The torque of the second electric motor M2 is raised in order to prevent the second electric motor M2 from being rotated by the rising torque of the first electric motor M1 and therefore prevent the engine 8 from freewheeling or rotating in a similar manner without a load.

Then, at a time t2 in an interval during which the start-up control is executed, the shift operation device 50 is operated by the driver so that the shift from the N range to the D range is executed. This shift is a shift in which the transmission mechanism 10, that is, the vehicle power transmission device, is switched from the non-driving state to the driving state. Since at this time, the start-up control of the engine is being executed, that is, since the engine 8 is to be started up later during the switch of the transmission mechanism 10, a change in the input torque to the transmission mechanism 10 is about to occur. Therefore, the change in the input torque is detected by the torque change detection device 86.

In accordance with the foregoing shift operation, the stepped ratio shift control device 82 supplies engagement pressure to the friction engagement device or devices that are to be engaged in the shift operation (e.g., the clutch C1 and the brake B3 in the case where the first speed step is established due to the shift from the N range to the D range). At this time, in the case where it is determined by the driver's intention determination device 90 that the degree of the driver's intention to start the vehicle is low or where the vehicle speed detected by the vehicle speed sensor 112 is lower than a predetermined value, the clutch transmission capacity during the switching of the state is switched by the engagement process alteration device 88 to a value that is different from the value used on an ordinary occasion, that is, in the case where the change in the torque is not detected by the torque change detection device 86.

For the period of the time t2 to a time t3, such a high engagement pressure that the working oil is rapidly charged is designated in order to quickly eliminate the back clearance of the friction engagement devices, as in the ordinary operation, as described above. Subsequently at the time t3, the engagement standby pressure PW' is designated as an engagement pressure. This engagement standby pressure PW' is set by the engagement process alteration device 88 at a value that is smaller than the engagement standby pressure PW used at the ordinary time. Incidentally, in FIG. 11, an interrupted line extending from the time t3 to the time t4 in the diagram showing time-dependent changes in the command value of the clutch engagement pressure represents ordinary-time engagement standby pressures PW.

As for the first electric motor M1 and the second electric motor M2, the output torques thereof are gradually raised from the time t1 on, and are brought to the highest value around the time t2. After the engine 8 reaches the rotation speed that allows the self-sustaining operation thereof, the output torque of each of the electric motors M1, M2 is lowered to a predetermined output torque that is needed in order to maintain the self-sustaining speed of the engine 8. Then, at a time tEG, the ignition is performed by the ignition device 68, so that the engine 8 is started up. After the engine 8 has been started up, the start-up control is ended at a time t4, and then the output torques of the first electric motor M1 and the second electric motor M2 are brought back to the values set prior to the start of the start-up control.

At the time t4, in accordance with the end of the start-up control, the alteration of the engagement standby pressure by the engagement process alteration device 88 also ends. Specifically, the engagement standby pressure that has been set at the lower-than-ordinary value PW' is set at the ordinary value PW. Then, at a time t5 at which a predetermined standby time elapses following the time t3, the command value of the engagement pressure begins to be gradually raised until a time t6, thus engaging the friction engagement devices.

According to the first embodiment, if a change in the input torque to the transmission mechanism 10 constituting a portion of the vehicle power transmission device is detected by the torque change detection device 86 (SA2) while the state of the transmission mechanism 10 is being switched from a non-driving state, for example, the neutral state, to a driving state, for example, the first speed step, by the stepped ratio shift control device 82 (SA1), the engagement standby pressure PW of the clutches and the brakes that are the engagement elements of the automatic ratio shift portion 20 is altered to PW' by the engagement process alteration device 88 (SA6), so that the transmission capacity of the engagement elements is switched to a value different from the value used at the ordinary time, that is, when there does not occur a change in the input torque to the transmission mechanism 10. Therefore, the transmission capacity of the engagement element or elements in a transitional state of engagement of the engagement elements is changed according to changes in the input torque. Hence, the shift shock can be reduced even in the case where the input torque to the transmission mechanism 10 changes during the switch of the state of the transmission mechanism 10 from the non-driving state to the driving state.

Besides, according to the first embodiment, since the change in the input torque is due to the start-up of the engine 8, the shift shock caused by the change in the input torque caused by the start-up of the engine 8 can be reduced.

Besides, according to the first embodiment, since the change in the input torque is also due to the stop of the engine 8, the shift shock caused by the change in the input torque caused by the stop of the engine 8 can be reduced.

Besides, according to the first embodiment, since the change in the input torque is due to the electrical charging control, the shift shock caused by the change in the input torque owing to the electrical charging control can be reduced.

Besides, according to the first embodiment, since the change in the input torque is due to the electrical discharging control, the shift shock caused by the change in the input torque owing to the electrical discharging control can be reduced.

Besides, according to the first embodiment, the electronic control unit 80 as the control device of the transmission mechanism 10 includes the vehicle start intention determination device 90 (SA3 to SA4) that determines the degree of the driver's intention to start the vehicle. If a change in the input torque to the transmission mechanism 10 is detected by the torque change detection device 86 (SA2) during the switch of the state of the transmission mechanism 10 from the non-driving state to the driving state performed by the stepped ratio shift control device 82 (SA1) in the case where the degree of the driver's intention to start the vehicle determined by the vehicle start intention determination device 90 is low, the engagement standby pressure PW of the clutches and the brakes that are the engagement elements of the automatic ratio shift portion 20 is altered to the value PW' different from the value used till that moment, so that the transmission capacity of the engagement elements is switched so as to be different from the ordinary-time transmission capacity. On the other hand, in the case where the degree of the driver's intention to start the vehicle is high, the transmission capacity of the engagement elements is set at the ordinary-time value. Therefore, a control of the transmission mechanism 10 with a high regard to response can be performed.

Besides, according to the first embodiment, the electronic control unit 80 as the control device of the transmission mechanism 10 includes the vehicle speed sensor 112 (SA5) as a vehicle speed-related value detection device that detects a vehicle speed-related value regarding the vehicle speed of the vehicle. If a change in the input torque to the vehicle power transmission device is detected by the torque change detection device 86 (SA2) during the switch of the state of the vehicle power transmission device from the non-driving state to the driving state performed by the stepped ratio shift control device 82 (SA1) in the case where the vehicle speed-related value detected by the vehicle speed sensor 112 is less than or equal to a predetermined value, the engagement standby pressure PW of the clutches and the brakes that are the engagement elements of the automatic ratio shift portion 20 is altered to the value PW' different from the value used till that moment, so that the transmission capacity of the engagement elements is switched so as to be different from the ordinary-time transmission capacity. On the other hand, in the case where the vehicle speed is higher than the predetermined value, the transmission capacity of the engagement elements is set at the ordinary-time value. Therefore, a control of the transmission mechanism 10 with a high regard to response can be performed.

Besides, according to the first embodiment, the differential motion portion 11 as the electrical differential motion portion operates as a continuously variable transmission when the operation state of the electric motor is controlled. Therefore, the transmission mechanism 10 including the differential motion portion 11 and the automatic ratio shift portion 20 can be operated as a continuously variable transmission, so that the speed change ratio γT of the transmission mechanism 10 as a whole can be smoothly changed. Incidentally, the differential motion portion 11 can also be operated as a stepped ratio transmission by changing the speed change ratio stepwise, in addition to being operated as an electric continuously variable transmission by continuously changing the speed change ratio γT.

Besides, according to the first embodiment, the automatic ratio shift portion 20 as the ratio shift portion is a stepped ratio transmission. Therefore, in the case where the differential motion portion 11 is caused to function as an electric continuously variable transmission, the continuously variable transmission is constructed of the differential motion portion 11 and the stepped-type hydraulic-type automatic ratio shift portion 20, so that the drive torque can be smoothly changed. Furthermore, during the state in which the differential motion portion 11 is controlled so that the speed change ratio thereof is constant, a state substantially equivalent to a stepped ratio transmission is constructed of the differential motion portion 11 and the stepped-type hydraulic-type automatic ratio shift portion 20, so that the overall speed change ratio γT of the hybrid vehicle driving device is changed stepwise, and a drive torque can be promptly obtained.

Next, a second embodiment of the invention will be described. In the following description, portions common between the first and second embodiments are assigned with the same reference characters, and descriptions thereof are omitted below.

In the first embodiment, if a change in the input torque is detected by the torque change detection device 86 when the vehicle power transmission device is switched from the non-driving state to the driving state, the engagement process alteration device 88 sets the engagement standby pressure of the friction engagement device or devices that are engaged during the switch of the vehicle power transmission device, to a value that is lower than the ordinary-time engagement standby pressure. In the second embodiment, if a change in the input torque is detected by the torque change detection device 86 when the vehicle power transmission device is switched from the non-driving state to the driving state, the timing at which the friction engagement device to be engaged by the switching of the vehicle power transmission device is engaged is delayed from the ordinary timing.

Incidentally, the second embodiment is also applied to a vehicle power transmission device that is similar to the device to which the first embodiment is applied. That is, FIGS. 1 to 10 show the second embodiment as well, and the descriptions thereof are omitted below.

The second embodiment is different from the first embodiment in the operation of the engagement process alteration device 88 shown in the functional block diagram of FIG. 7. Specifically, if a change in the torque input to the transmission mechanism 10 is detected by the torque change detection device 86 during the switch of the transmission mechanism 10 from the non-driving state to the driving state executed by the stepped ratio shift control device 82, the engagement process alteration device 88 alters the process of the switching of the transmission mechanism 10 from the non-driving state to the driving state, concretely, the process of the engagement of the friction engagement device or devices, to a process different from the ordinary process, for example, as shown in FIG. 14. The content of the alteration is different between the first and second embodiments.

Concretely, the engagement process alteration device 88 delays the execution of the switch of the transmission mechanism 10 from the non-driving state to the driving state, that is, the engagement of the friction engagement device or devices (e.g., the clutch C1 and the brake B3 in the case where the first speed step in the automatic ratio shift portion 20 is established in the N→D garage shift), from the ordinary timing of the execution. Specifically, in the example shown in FIG. 14, the driver's operation of the shift operation device 50 and the start of the engagement of the friction engagement device occur substantially simultaneously at the time t31. However, according to the engagement process alteration device 88 of the second embodiment, the engagement of the friction engagement device is started after a predetermined time elapses following the driver's operation of the shift operation device 50. The predetermined time herein is, for example, in the case where the engine 8 is started up, a time that is needed before the influence of the start-up of the engine 8 on the changing of the input torque to the transmission mechanism 10 decreases to such a degree that the switch of the transmission mechanism 10 from the non-driving state to the driving state will not give a shock to the vehicle, and is calculated empirically or through simulation beforehand.

In addition, in the second embodiment, similarly to the first embodiment, the engagement process alteration device 88 is designed to execute its function only in the case where it is determined by a driver's intention determination device 90 (described below) that the driver's intention to start the vehicle is low. Besides, it is also designed so that the function is executed only in the case where the vehicle speed detected by the vehicle speed sensor 112 is less than or equal to the predetermined value.

Figure 12:
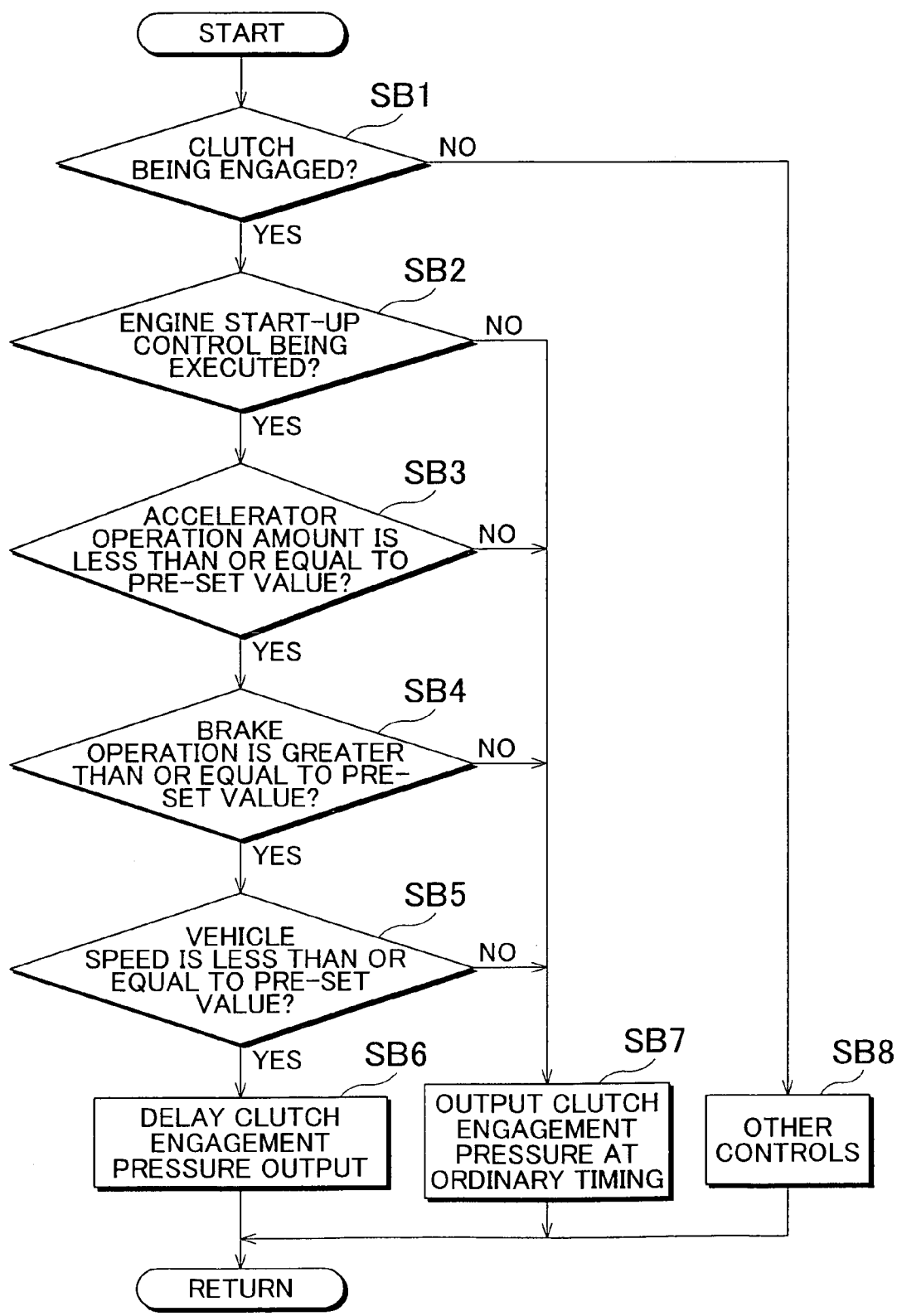
FIG. 12 is a flowchart illustrating a control operation of the electronic control unit in FIG. 4 in a second embodiment of the invention, that is, a control operation for reducing the shift shock at the time of the switch of the automatic ratio shift portion from the non-driving state to the driving state, and corresponds to FIG. 10.

The flowchart in FIG. 12 generally shows the operation of a control device of a vehicle power transmission device in the second embodiment, and corresponds to the flowchart shown in FIG. 10. Steps SB1 to SB5 and SB8 (hereinafter, "step" will be omitted) in FIG. 12 correspond to SA1 to SA5 and SA8 in FIG. 10, and have the same contents of operation as those steps in FIG. 10; therefore, the descriptions of the steps are omitted below.

In SB6, corresponding to the engagement process alteration device 88, the process of engagement of the friction engagement device or devices to be engaged at the time of the switch of the transmission mechanism 10 from the non-driving state to the driving state (e.g., the clutch C1 and the brake B3 in the case where the first speed step in the automatic ratio shift portion 20 is established in the N→D garage shift) is altered. Concretely, for example, the engagement of the friction engagement devices is executed with a delay from the ordinary timing of the engagement.

On another hand, SB7 is a step that is executed in the case where a negative determination is made in SB2, that is, it is determined that the start-up control of the engine is not being executed, or in the case where a negative determination is made in any one of three steps SB3 to SB5. In SB7, the alteration of the engagement process of the friction engagement devices is not performed, but the engagement of the friction engagement devices is executed by, for example, following the prescribed engagement process of the friction engagement devices as shown in FIG. 14.

Figure 13:
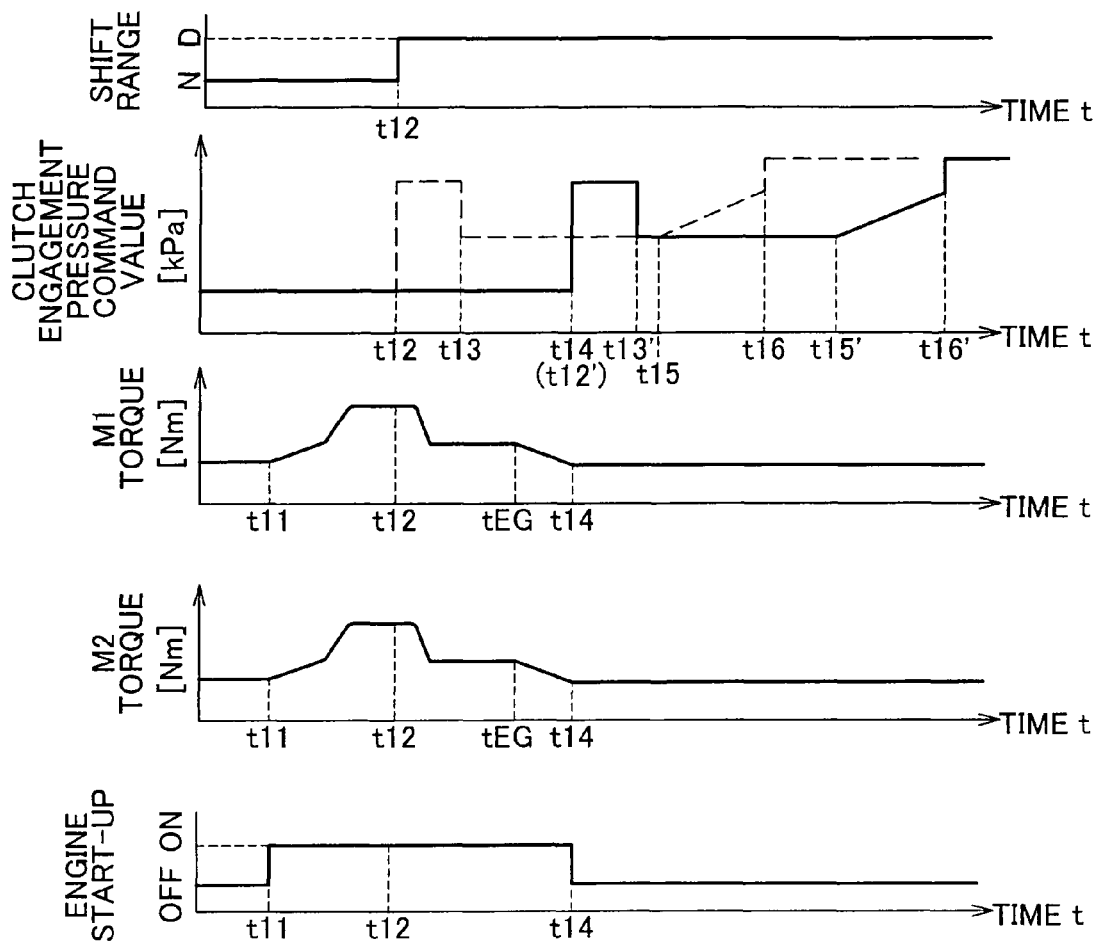
FIG. 13 is a time chart illustrating the control operation shown in the flowchart of FIG. 12 in the second embodiment, in conjunction with a case where the start-up control of the engine s being performed when a shift operation, for example, from the N range to the D range, is performed.

FIG. 13 is an example of a time chart for describing the control operation of the control device of the vehicle power transmission device in accordance with the second embodiment of the invention, and corresponds to FIG. 11. FIG. 13 shows the operation of the shift operation device 50, the command value of the engagement pressure of the friction engagement device that is engaged by a shift operation, the output torque of the first electric motor M1, the output torque of the second electric motor M2, and the presence/absence of the start-up control of the engine along the vertical axis, together with time along the horizontal axes of the same scale.

At a time t11, a start-up control for starting up the engine 8, which has been caused to be at rest by the hybrid control device 84, is started on the basis of, for example, a decline of the SCO of the electricity storage device 56. Due to the start of the engine start-up control, the output torques of the first electric motor M1 and the second electric motor M2 are raised. The torque of the first electric motor M1 is raised in order to operate the first electric motor M1 as a starter motor of the engine 8 so as to cause the engine 8 to rotate at a rotation speed that allows the self-sustaining operation thereof. The torque of the second electric motor M2 is raised in order to prevent the second electric motor M2 from being rotated by the rising torque of the first electric motor M1 and therefore prevent the engine 8 from freewheeling or rotating in a similar manner.

Then, at a time t12 at which the start-up control is being executed, the shift operation device 50 is operated by the driver so that the shift from the N range to the D range is executed. This shift is a shift in which the transmission mechanism 10, that is, the vehicle power transmission device, is switched from the non-driving state to the driving state. Since at this time, the start-up control of the engine is being executed, it is considered that as the engine 8 is started up later, that is, during the switch of the transmission mechanism 10, a change in the input torque to the transmission mechanism 10 can occur. Therefore, the change in the input torque is detected by the torque change detection device 86.

In accordance with the foregoing shift operation, the stepped ratio shift control device 82 commands the supply of the engagement pressure to the friction engagement device or devices that are to be engaged in the shift operation (e.g., the clutch C1 and the brake B3 in the case where the first speed step is established due to the shift from the N range to the D range). However, at this time, in the case where it is determined by the driver's intention determination device 90 that the degree of the driver's intention to start the vehicle is low or where the vehicle speed detected by the vehicle speed sensor 112 is lower than a predetermined value, the engagement of the friction engagements, that is, the command to output the engagement pressure, is delayed in comparison with an ordinary time, that is, when the change in the torque is not detected by the torque change detection device 86.

That is, in the case where the delay of the engagement of the friction engagement devices by the engagement process alteration device 88 is not performed, such a high engagement pressure that the working oil is rapidly charged is designated in order to quickly eliminate the back clearance of the friction engagement devices, for the period of the time t12 to a time t13, as in the ordinary operation, as described above. Subsequently, during a period from the time t13 to a time t15, the engagement standby pressure PW is designated as an engagement pressure. Then, during a period from the time t15 to a time t16, the engagement is executed. Incidentally, in FIG. 13, an interrupted line extending from the time t12 in the diagram showing time-dependent changes in the command value of the clutch engagement pressure represents time-dependent changes of the command value of the ordinary-time engagement pressure.

As for the first electric motor M1 and the second electric motor M2, the output torques thereof are gradually raised from the time t11 on, and are brought to the highest value around the time t12. After the engine 8 reaches the rotation speed that allows the self-sustaining operation thereof, the output torque of each of the electric motors M1, M2 is lowered to a predetermined output torque that is needed in order to maintain the self-sustaining speed of the engine 8. Then, at a time tEG, the ignition is performed by the ignition device 68, so that the engine 8 is started up. After the engine 8 has been started up, the start-up control is ended at a time t14, and then the output torques of the first electric motor M1 and the second electric motor M2 are brought back to the values set prior to the start of the start-up control.

Therefore, the engagement process alteration device 88 does not give a command to output the engagement pressure to the friction engagement devices, while a change in the torque is being detected by the torque change detection device 86, that is, until the start-up control ends at the time t14. Then, after the start-up control ends at the time t14 and the detection of a change in the torque by the torque change detection device 86 ceases, the supply of the engagement pressure is started. Concretely, such a high engagement pressure that the working oil is rapidly charged is designated in order to quickly eliminate the back clearance of the friction engagement devices, for the period from a time t12' (time t14) corresponding to the time t12 in the ordinary occasion to a time t13'. Subsequently, during a period from the time t13' to a time t15', the engagement standby pressure PW is designated as an engagement pressure. Then, during a period from the time t15' to a time t16', the engagement is executed. The amounts of time of rapid charge before and after the alteration of the engagement process, that is, before and after the delay of the engagement of the friction engagement devices (i.e., the pre-alteration interval of the time t12 to the time t13, and the post-alteration interval of the time t12' to the time t13'), the amounts of time of standby at the engagement standby pressure before and after the alteration of the engagement process (i.e., the pre-alteration interval of the time t13 to the time t15, and the post-alteration interval of the time t13' to the time t15'), and the amounts of time of execution of the engagement before and after the alteration of the engagement process (i.e., the pre-alteration interval of the time t5 to the time t6, and the post-alteration interval of the time t15' to the time t16') are, for example, set as the same amount of time.

According to the second embodiment, if a change in the input torque to the transmission mechanism 10 constituting a portion of the vehicle power transmission device is detected by the torque change detection device 86 (SB2) while the state of the transmission mechanism 10 is being switched from a non-driving state, for example, the neutral state, to a driving state, for example, the first speed step, by the stepped ratio shift control device 82 (SB1), the engagement of the clutches and the brakes that are the engagement elements of the automatic ratio shift portion 20 is delayed by the engagement process alteration device 88 (SB6) in comparison with at the ordinary time, that is, in comparison with when there does not occur a change in the input torque to the transmission mechanism 10. Therefore, the engagement elements are engaged after the change in the input torque has converged or has become diminished. Hence, the shift shock can be reduced even in the case where the input torque to the transmission mechanism 10 changes during the switch of the state of the transmission mechanism 10 from the non-driving state to the driving state.

Besides, according to the second embodiment, since the change in the input torque is due to the start-up of the engine 8, the shift shock caused by the change in the input torque caused by the start-up of the engine 8 can be reduced.

Besides, according to the second embodiment, since the change in the input torque is also due to the stop of the engine 8, the shift shock caused by the change in the input torque caused by the stop of the engine 8 can be reduced.

Besides, according to the second embodiment, since the change in the input torque is due to the electrical charging control, the shift shock caused by the change in the input torque owing to the electrical charging control can be reduced.

Besides, according to the second embodiment, since the change in the input torque is due to the electrical discharging control, the shift shock caused by the change in the input torque owing to the electrical discharging control can be reduced.

Besides, according to the second embodiment, the electronic control unit 80 as the control device of the transmission mechanism 10 includes the vehicle start intention determination device 90 (SB3 to SB4) that determines the degree of the driver's intention to start the vehicle. If a change in the input torque to the transmission mechanism 10 is detected by the torque change detection device 86 (SA2) during the switch of the state of the transmission mechanism 10 from the non-driving state to the driving state performed by the stepped ratio shift control device 82 (SB1) in the case where the degree of the driver's intention to start the vehicle determined by the vehicle start intention determination device 90 is low, the engagement of the engagement elements of the automatic ratio shift portion 20 is delayed in comparison with at the ordinary time. On the other hand, in the case where the degree of the driver's intention to start the vehicle is high, the engagement of the engagement elements performed as the ordinary-time engagement. Therefore, a control of the transmission mechanism 10 with a high regard to response can be performed.

Besides, according to the second embodiment, the electronic control unit 80 as the control device of the transmission mechanism 10 includes the vehicle speed sensor 112 (SB5) as a vehicle speed-related value detection device that detects a vehicle speed-related value regarding the vehicle speed of the vehicle. If a change in the input torque to the vehicle power transmission device is detected by the torque change detection device 86 (SB2) during the switch of the state of the vehicle power transmission device from the non-driving state to the driving state performed by the stepped ratio shift control device 82 (SB1) in the case where the vehicle speed-related value detected by the vehicle speed sensor 112 is less than or equal to a predetermined value, the engagement of the engagement elements of the automatic ratio shift portion 20 is delayed in comparison with at the ordinary time. On the other hand, in the case where the vehicle speed, that is, a vehicle speed-related value, is higher than the predetermined value, the engagement of the engagement elements is performed as the ordinary-time engagement. Therefore, a control of the transmission mechanism 10 with a high regard to response can be performed.

Besides, according to the second embodiment, the differential motion portion 11 as the electrical differential motion portion operates as a continuously variable transmission when the operation state of the electric motor is controlled. Therefore, the transmission mechanism 10 including the differential motion portion 11 and the automatic ratio shift portion 20 can be operated as a continuously variable transmission, so that the speed change ratio $\gamma T$ of the transmission mechanism 10 as a whole can be smoothly changed. Incidentally, the differential motion portion 11 can also be operated as a stepped ratio transmission by changing the speed change ratio stepwise, in addition to being operated as an electric continuously variable transmission by continuously changing the speed change ratio $\gamma T$.

Besides, according to the second embodiment, the automatic ratio shift portion 20 as the ratio shift portion is a stepped ratio transmission. Therefore, in the case where the differential motion portion 11 is caused to function as an electric continuously variable transmission, the continuously variable transmission is constructed of the differential motion portion 11 and the stepped-type hydraulic-type automatic ratio shift portion 20, so that the drive torque can be smoothly changed. Furthermore, during the state in which the differential motion portion 11 is controlled so that the speed change ratio thereof is constant, a state substantially equivalent to a stepped ratio transmission is constructed of the differential motion portion 11 and the stepped-type hydraulic-type automatic ratio shift portion 20, so that the overall speed change ratio $\gamma T$ of the hybrid vehicle driving device is changed stepwise, and a drive torque can be promptly obtained.

While the embodiments of the invention have been described in detail with reference to the drawings, the invention is also applicable in other forms.

For example, although the first embodiment and the second embodiment are described above as separate embodiments, the two embodiments may also be simultaneously applied to a device. Specifically, at the time of engagement of the engagement elements, the engagement process alteration device 88 may delay the output of the engagement oil pressure in comparison with at the ordinary time and may also alter the engagement standby pressure PW so that the engagement standby pressure PW becomes lower than the ordinary-time value thereof. This will reduce the shift shock and execute the engagement of the engagement elements earlier than in the case of only the delay of the output of the engagement oil pressure in comparison with at the ordinary time.

Besides, although in the foregoing embodiments, the alteration of the engagement process of the engagement elements by the engagement process alteration device 88 (SA6 or SB6) is executed only in the case where it is determined by the driver's intention determination device 90 (SA3 and SA4, or SB3 and SB4) that the driver's intention to start the vehicle is low on the basis of the accelerator operation amount Acc and one of the master cylinder pressure and the output of the brake switch, this is not restrictive. For example, the alteration of the engagement process of the engagement elements may be executed in the case where it is determined that the driver's intention to start the vehicle is low on the basis of at least one of the aforementioned factors.

Besides, although in the foregoing embodiments, the alteration of the engagement process of the engagement elements by the engagement process alteration device 88 is executed only in the case where it is determined by the driver's intention determination device 90 that the driver's intention to start the vehicle is low or where the vehicle speed detected by the vehicle speed sensor 112 is less than or equal to a predetermined speed, this is not restrictive. The alteration of the engagement process of the engagement elements by the engagement process alteration device 88 may also be executed simply if a change in the input torque to the vehicle power transmission device is detected by the torque change detection device 86 in the case where the automatic ratio shift portion 20 is controlled so as to change from the non-driving state to the driving state by the stepped ratio shift control device 82. In this case, it is not altogether necessary to provide the vehicle speed sensor 112 and the driver's intention determination device 90.

Besides, although in the foregoing embodiments, the torque change detection device 86 detects a change in the input torque to the transmission mechanism 10 as the vehicle power transmission device on the basis of the presence/absence of the start-up control of the engine 8 executed by the hybrid control device 84, this is not restrictive. For example, it can also be determined whether or not there is a change in the input torque on the basis of the presence/absence of the stop control of the engine 8. Besides, a change in the input torque may also be detected on the basis of execution of a control that includes the start-up or stop of the engine 8 as a part of the control, for example, the electrical charging control, the electrical discharging control, etc. Besides, the detection of a torque change by the torque change detection device 86 may be performed by predicting a torque change that is to occur, or may also be performed on the basis of whether or not the influence of the torque change that has occurred has converged or has become diminished.

Besides, although in the foregoing embodiments, the engagement process alteration device 88 ends the alteration of the engagement process of the engagement elements on the basis of the end of the start-up control of the engine 8, this is not restrictive. For example, the convergence or diminishment of the actual change in the input torque to the transmission mechanism 10 may be detected, and the alteration of the engagement process of the engagement elements may be ended on the basis of the detected convergence or diminishment of the change in the input torque.

Besides, although in the foregoing embodiments, the definition of the period of the switch from the non-driving state to the driving state is, for example, the period of t31 to t34 in FIG. 14, this is not restrictive, and other definition may also be adopted.

Besides, although in the foregoing embodiments, the vehicle speed calculated from the value detected by the vehicle speed sensor 112 provided at the output shaft of the transmission mechanism 10 is used as the vehicle speed-related value, the calculation method for the vehicle speed is not limited so. The vehicle speed may also be calculated on the basis of a detected rotation speed of the transmission member 18 or a detected rotation speed of the driving wheels 34. Besides, the vehicle speed-related value is not limited to the vehicle speed, but may also be an index that is in a one-to-one relation with the vehicle speed.

Besides, although in the foregoing embodiments, the driver's intention determination device 90 determines the driver's intention to start the vehicle on the basis of the accelerator operation amount Acc detected by the accelerator operation amount sensor 102, this is not restrictive. For example, the driver's intention to start the vehicle may also be determined on the basis of the degree of throttle opening or the like.

Besides, although in the foregoing embodiments, the engagement elements provided in the automatic ratio shift portion 20 are the clutches and the brakes as hydraulic type friction engagement devices, this is not restrictive. For example, engagement elements such as a powder clutch, an electromagnetic clutch, etc., may also be used.

Besides, although in the foregoing embodiments, the torque change detection device 86 detects a change in the input torque to the input shaft of the transmission mechanism 10, for example, on the basis of the command output by the hybrid control device 84 to start the engine 8 or to stop the engine, this is not restrictive. Specifically, the change in the input torque to the transmission mechanism 10 may be actually detected, and the torque change may be considered to be detected when a change that is greater than or equal to a predetermined value is detected.

Besides, although in the foregoing embodiments, the engagement process alteration device 88 alters the engagement standby pressure of the friction engagement device C1 that is a power connection-disconnection device to a smaller value PW' (PW'<PW) if a change in the torque input to the transmission mechanism 10 is detected by the torque change detection device 86 during the switch of the transmission mechanism 10 from the non-driving state to the driving state executed by the stepped ratio shift control device 82, the value of PW' is not limited to a constant value. For example, the value of PW' may be varied according to the magnitude of the change in the torque detected by the torque change detection device 86. Concretely, for example, the value of PW' may be made smaller the larger the detected change in the torque. Similarly, the time of delay of the engagement of the friction engagement device C1 as a power connection-disconnection device that is subjected to the alteration performed by the engagement process alteration device 88 may also be altered according to the detected change in the torque.

Besides, although in the foregoing embodiments, the differential motion portion 11 is designed so as to operate as a continuously variable transmission, this is not restrictive. The differential motion portion 11 may also be operated as a stepped ratio transmission that achieves one or more of a plurality of fixed speed change ratios.

Besides, although in the foregoing embodiments, the transmission mechanism 10 as a power transmission device has a construction in which the differential motion portion 11 and the automatic ratio shift portion 20 are connected in series so that the power from the engine 8 as a motive power source is transmitted by the differential motion portion 11 and the automatic ratio shift portion 20 in that order, this is not restrictive. The transmission mechanism 10 may also have a construction in which the power from the engine 8 is transmitted by the automatic ratio shift portion 20 and the differential motion portion 11 in that order.

Besides, although in the foregoing embodiments, the transmission mechanism 10 as a power transmission device is a transmission mechanism in which the differential motion portion 11 and the automatic ratio shift portion 20 are connected in series via the transmission member 18, this is not restrictive. The invention is applicable to any power transmission device if the power transmission device has a construction that includes a function of performing electrical operation as the whole power transmission device, and a function of performing, as the whole power transmission device, the ratio shift on a principle that is different from the principle of the ratio shift performed on the basis of electrical differential motion. The differential motion portion and the automatic ratio shift portion do not need to be mechanically independent.

For example, the invention is also applicable to a construction in which two planetary gear devices are interlinked by their portions, and in which various rotating elements are linked with an internal combustion engine, an electric motor, and driving wheels so that power can be transmitted therebetween, and in which the switching between the stepped ratio shift and the stepless ratio shift can be performed by controlling the clutches or brakes connected to the rotating elements of a planetary gear.

Besides, in the foregoing embodiments, the planetary gear device is a single planetary structure, this is not restrictive. For example, the planetary gear device may also be of a different structure, such as a double-planetary structure, or the like.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A control device for a vehicle power transmission device including an electrical differential motion portion in which a differential state between an input shaft rotation speed and an output shaft rotation speed is controlled through control of an operation state of an electric motor linked to a rotating element of a differential motion portion, and a power connection-disconnection device constituting a portion of a power transmission path, comprising
a controller that lessens a transmission capacity of the power connection-disconnection device if during a switch of a state of the vehicle power transmission device from a non-driving state to a driving state, a change in input torque to the vehicle power transmission device occurs, in comparison with when the change in the input torque does not occur.

2. The control device according to claim 1, wherein the change in the input torque is due to start-up of an engine.

3. The control device according to claim 1, wherein the change in the input torque is due to stop of an engine.

4. The control device according to claim 1, wherein the change in the input torque is due to a charging control of an electricity storage device.

5. The control device according to claim 1, wherein the change in the input torque is due to a discharging control of an electricity storage device.

6. The control device according to claim 1, further comprising a vehicle start intention determination device that determines degree of a driver's intention to start a vehicle,
wherein if the degree of the driver's intention to start the vehicle determined by the vehicle start intention determination device is low, the controller lessens the transmission capacity of the power connection-disconnection device when the change in the input torque to the vehicle power transmission device occurs during the switch of the state of the vehicle power transmission device from the non-driving state to the driving state in comparison with when the change in the input torque does not occur.

7. The control device according to claim 1, further comprising a vehicle speed-related value detection device that detects a vehicle speed-related value regarding vehicle speed of a vehicle,
wherein if the vehicle speed-related value detected by the vehicle speed-related value detection device is less than or equal to a predetermined value, the controller lessens the transmission capacity of the power connection-disconnection device when the change in the input torque to the vehicle power transmission device occurs during the switch of the state of the vehicle power transmission device from the non-driving state to the driving state in comparison with when the change in the input torque does not occur.

8. The control device according to claim 1, wherein the electrical differential motion portion operates as a continuously variable transmission when the operation state of the electric motor is controlled.

9. The control device according to claim 1, wherein the vehicle power transmission device comprises a ratio shift portion that constitutes a portion of the power transmission path, and the power connection-disconnection device is an engagement element that constitutes the ratio shift portion.

10. The control device according to claim 9, wherein the ratio shift portion is a stepped ratio transmission.

11. A control device for a vehicle power transmission device including an electrical differential motion portion in which a differential state between an input shaft rotation speed and an output shaft rotation speed is controlled through control of an operation state of an electric motor linked to a rotating element of a differential motion portion, and a power connection-disconnection device constituting a portion of a power transmission path, comprising
a controller that delays start of connection by the power connection-disconnection device if during a switch of a state of the vehicle power transmission device from a non-driving state to a driving state, a change in input torque to the vehicle power transmission device occurs, in comparison with when the change in the input torque does not occur.

12. The control device according to claim 11, wherein the change in the input torque is due to start-up of an engine.

13. The control device according to claim 11, wherein the change in the input torque is due to stop of an engine.

14. The control device according to claim 11, wherein the change in the input torque is due to a charging control of an electricity storage device.

15. The control device according to claim 11, wherein the change in the input torque is due to a discharging control of an electricity storage device.

16. The control device according to claim 11, further comprising a vehicle start intention determination device that determines degree of a driver's intention to start a vehicle,
wherein if the degree of the driver's intention to start the vehicle determined by the vehicle start intention determination device is low, the controller delays start of connection by the power connection-disconnection device in a case where the change in the input torque to the vehicle power transmission device occurs during the switch of the state of the vehicle power transmission device from the non-driving state to the driving state, in comparison with when the change in the input torque does not occur.

17. The control device according to claim 11, further comprising a vehicle speed-related value detection device that detects a vehicle speed-related value regarding vehicle speed of a vehicle, wherein if the vehicle speed-related value detected by the vehicle speed-related value detection device is less than or equal to a predetermined value, the controller delays start of connection by the power connection-disconnection device in a case where the change in the input torque to the vehicle power transmission device occurs during the switch of the state of the vehicle power transmission device from the non-driving state to the driving state, in comparison with when the change in the input torque does not occur.

18. The control device according to claim 11, wherein the electrical differential motion portion operates as a continuously variable transmission when the operation state of the electric motor is controlled.

19. The control device according to claim 11, wherein the vehicle power transmission device comprises a ratio shift portion that constitutes a portion of the power transmission path, and the power connection-disconnection device is an engagement element that constitutes the ratio shift portion.

20. The control device according to claim 19, wherein the ratio shift portion is a stepped ratio transmission.

* * * * *

UNITED STATES PATENT AND TRADEMARK OFFICE
CERTIFICATE OF CORRECTION

| | | |
|---|---|---|
| PATENT NO. | : 7,824,307 B2 | Page 1 of 1 |
| APPLICATION NO. | : 12/213516 | |
| DATED | : November 2, 2010 | |
| INVENTOR(S) | : Tooru Matsubara et al. | |

It is certified that error appears in the above-identified patent and that said Letters Patent is hereby corrected as shown below:

On the title page item [73] Assignee to read as follows:

--[73] Assignee: Toyota Jidosha Kabushiki Kaisha, Toyota, Japan
                      Aisin AW Co. Ltd., Anjo, Japan--

Signed and Sealed this
Sixteenth Day of April, 2013

Teresa Stanek Rea
*Acting Director of the United States Patent and Trademark Office*